(12) United States Patent
Ozawa et al.

(10) Patent No.: US 9,195,065 B2
(45) Date of Patent: Nov. 24, 2015

(54) THREE-DIMENSIONAL IMAGE DISPLAY SYSTEM, THREE-DIMENSIONAL IMAGE DISPLAY METHOD, AND THREE-DIMENSIONAL EYEGLASSES

(71) Applicant: PANASONIC CORPORATION, Osaka (JP)

(72) Inventors: Jun Ozawa, Nara (JP); Yumiko Kato, Osaka (JP); Tsuyoshi Inoue, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 191 days.

(21) Appl. No.: 13/870,310

(22) Filed: Apr. 25, 2013

(65) Prior Publication Data

US 2013/0242387 A1  Sep. 19, 2013

Related U.S. Application Data

(63) Continuation of application No. PCT/JP2012/002908, filed on Apr. 27, 2012.

(30) Foreign Application Priority Data

May 20, 2011  (JP) ................................. 2011-113165

(51) Int. Cl.
  *G02B 27/22*  (2006.01)
  *G02B 27/14*  (2006.01)
  (Continued)

(52) U.S. Cl.
  CPC ........ *G02B 27/0093* (2013.01); *G02B 27/2264* (2013.01); *H04N 13/0438* (2013.01); *G09G 3/003* (2013.01); *H04N 2213/008* (2013.01)

(58) Field of Classification Search
  CPC ................... H04N 13/0497; H04N 2213/002; H04N 2213/008; G02B 27/22; A61B 5/16
  USPC ................ 359/464–466, 630; 348/43, 53–56, 348/E13.062, E13.64, E13.071, E13.075, 348/E13.074; 340/10.4, 5.82; 345/205–207, 345/714, 419
  See application file for complete search history.

(56) References Cited

U.S. PATENT DOCUMENTS 5,821,989 A * 10/1998 Lazzaro et al. ................. 348/56
2010/0157425 A1* 6/2010 Oh ................................ 359/464

(Continued)

FOREIGN PATENT DOCUMENTS

JP   8-289327   11/1996
JP   2006-305325   11/2006

(Continued)

OTHER PUBLICATIONS

International Search Report (in English language) issued in International Application No. PCT/JP2012/002908 on Jul. 24, 2012.

*Primary Examiner* — Scott J Sugarman
*Assistant Examiner* — Mustak Choudhury
(74) *Attorney, Agent, or Firm* — Wenderoth, Lind & Ponack, L.L.P.

(57) ABSTRACT

Provided is a three-dimensional image display system including: eyeglasses including a type information transmission unit which transmits type information of the eyeglasses and a potential information transmission unit which transmits a biopotential of a viewer as potential information; and a three-dimensional display TV including a type information reception unit which receives the type information, an electrode position determination unit which determines, based on the received type information, a position of an electrode included in the eyeglasses, a potential information reception unit which receives the transmitted potential information, and a wearing conditions determination unit which determines wearing conditions of the viewer wearing the eyeglasses, based on the determined electrode position and the received potential information.

11 Claims, 25 Drawing Sheets

(51) Int. Cl.
*G02B 27/00* (2006.01)
*H04N 13/04* (2006.01)
*G09G 3/00* (2006.01)

(56) References Cited

U.S. PATENT DOCUMENTS

2011/0028805 A1  2/2011  Yamazaki
2011/0216175 A1*  9/2011  Shimoyama et al. .......... 348/56

FOREIGN PATENT DOCUMENTS

| | | |
|---|---|---|
| JP | 2010-154533 | 7/2010 |
| JP | 2010-268036 | 11/2010 |
| JP | 2011-28633 | 2/2011 |
| JP | 2012-209761 | 10/2012 |
| JP | 2012-235952 | 12/2012 |

* cited by examiner

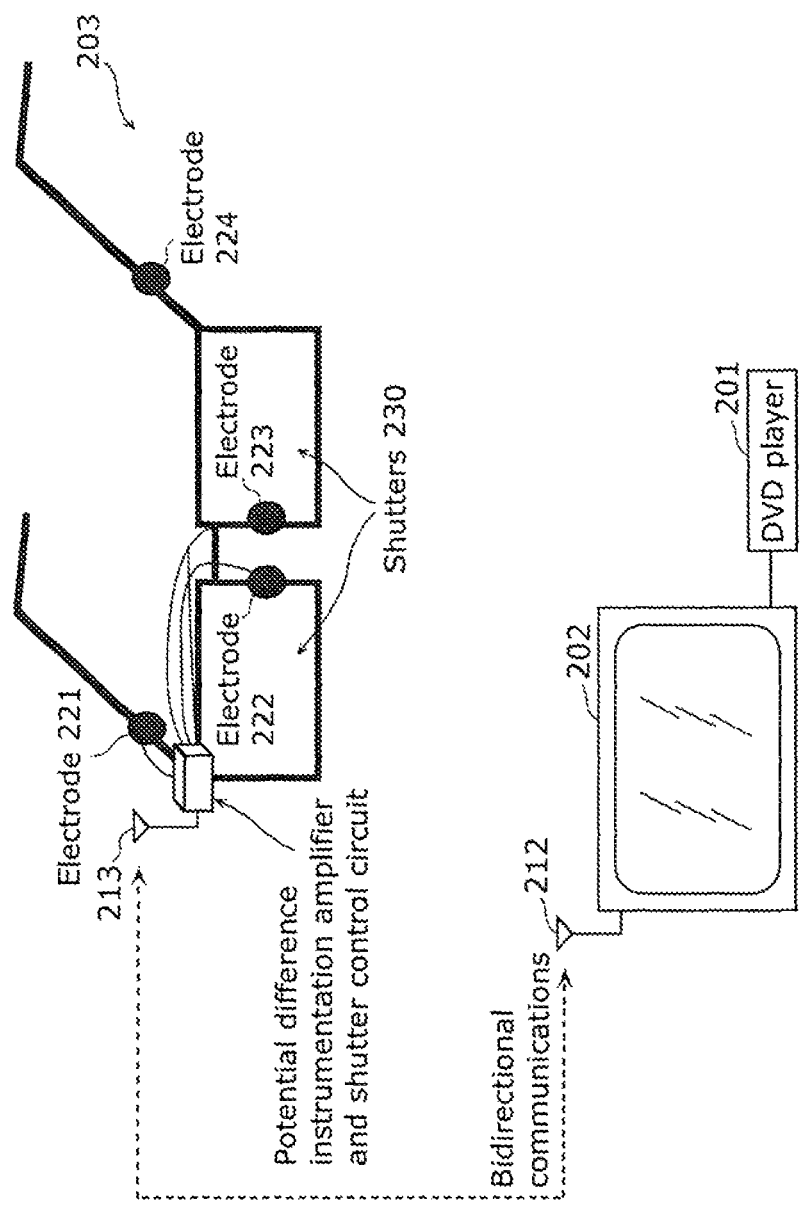

FIG. 3

| Manufacture date | 2011/4/22 |
| --- | --- |
| Manufacturer | Company Pa |
| Serial number | 324AS89732 |
| Eyeglasses model ID | PX1 |
| Eyeglasses type ID | PX1-342 |

(a) Example of XML structured format

```
<XML="xxxxxx.dtd">
<head>
  <glass_id>324AS89732</glass_id>
  <glass_model>PX1</glass_model>
  <glass_model_id>PX1-342</glass_model_id>
</head>
<body>
  <glass_open>1</glass_open>
  <action>poweron</action>
</body>
```

(b) Example of packet format

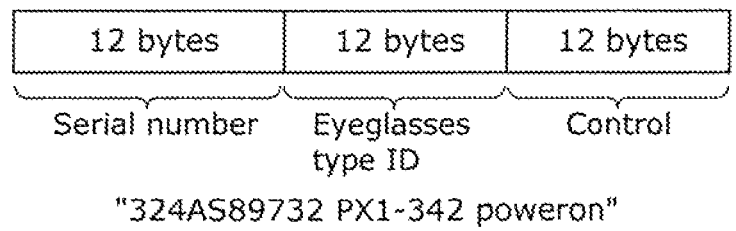

"324AS89732 PX1-342 poweron"

FIG. 5

| Manufacturer | Eyeglasses model ID | Eyeglasses type ID | RR | RL | RH | RD | RF | RB | LL | LR | LH | LD | LF | LB |
|---|---|---|---|---|---|---|---|---|---|---|---|---|---|---|
| Company Pa | PX1 | PX1-342 |  | 1 |  |  | 1 | 1 |  | 1 |  |  | 1 | 1 |
| Company Pa | PX2 | PX2-211 |  | 1 |  |  | 1 |  |  | 1 |  |  | 1 |  |
| ... | ... | ... |  |  |  |  |  |  |  |  |  |  |  |  |
| Company Su | SA1 | SA1-01 |  | 2 |  |  | 1 |  |  | 2 |  |  |  |  |
| Company Su | SA2 | SA2-11 |  |  |  |  |  |  | 1 |  |  |  | 1 |  |
| ... | ... | ... |  |  |  |  |  |  |  |  |  |  |  |  |
| Company Sh | Sh2 | Sh2-122 | 1 | 1 |  |  |  |  |  | 1 |  |  |  |  |

109

(a) Confirmation screen for eyeglasses registration (b) Data to be transmitted from display device to eyeglasses upon confirmation of data receipt

```
<xml="xxxxxx.dtd">
<head>
  <display_id>tv321</display_id>
  <display_model>PA21</display_model>
  <disp_model_id>PA21-22</display_model_id>
  <to_glass_id>324AS89732</to_glass_id>
</head>
<body>
  <action>ack</action>
</body>
```

FIG. 9

(a) Data format for communication 2

| Header information | | | | Potential information | | |
|---|---|---|---|---|---|---|
| 32 bytes | 32 bytes | 32 bytes | 32 bytes | 128 bytes | 128 bytes | 128 bytes |
| Type information | Transmission date | Transmission time | Destination display device ID | Biopotential data at RL | Biopotential data at LR | ... |

(b) Transmission data content in XML

```
<xml="glass_TV.dtd">
<head>
  <glass_id>324AS89732</glass_id>     Type information
  <date>2011/04/24</date>              Transmission date
  <time>13:12:15:100</time>            Transmission time
  <disp_id>tv321</disp_id>             Destination display device ID
</head>
<body>
  <electric_potential_data>            Potential information
    <RL>
      12,13,12,15,13,12,11,10          Biopotential data at RL
    </RL>
    <LR>
      12,13,12,15,13,12,11,10          Biopotential data at LR
    </LR>
  </electric_potential_data>
</body>
```

FIG. 10

| Functional details | Position of required electrode | Sampling time for measurement | Potential state determination |
|---|---|---|---|
| Eyeglasses-wearing check 1 | RL, RR, LR, LL | 1,000 ms | 10 μV<RL<50 μV,··· |
| Eyeglasses-wearing check 2 (simplified) | RL, LR | 5,000 ms | 10 μV<RL<50 μV,··· |
| ··· | | | |

```
<xml="glass_TV.dtd">
<head>
 <display_id>tv321</display_id>    Display device ID
 <date>2011/04/24</date>            Transmission date
  <time>13:12:16:100</time>         Transmission time
 <glass_id>12345</glass_id>         Destination eyeglasses ID
</head>
<body>
  <glass_control>                   Control information
    <left_shutter ="open"/>         Open left-eye shutter
    <right_shutter ="close"/>       Close right-eye shutter
  <glass_control/>
</body>
```

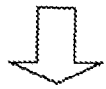 After 16 ms (1000/60 ms) 60 Hz

```
<xml="glass_TV.dtd">
<head>
 <display_id>tv321</display_id>    Display device ID
 <date>2011/04/24</date>            Transmission date
  <time>13:12:16:117</time>         Transmission time
 <glass_id>12345</glass_id>         Destination eyeglasses ID
</head>
<body>
  <glass_control>                   Control information
    <left_shutter ="close"/>        Close left-eye shutter
    <right_shutter ="open"/>        Open right-eye shutter
  <glass_control/>
</body>
```

(a)

| Manufacture date | 2011/4/18 |
| --- | --- |
| Manufacturer | Company Sh |
| Serial number | X533F4353 |
| Eyeglasses model ID | SX1 |
| Eyeglasses type ID | SX1-532 |
| Electrode position information | RL, RF, LR, LF |
| ... | ... |

```
                Communication requesting/responding
                for electrode position information <xml="xxxxxx.dtd">
                    <head>
                     <from_display_id>tv321</from_display_id>
                     <to_glass_id>X533F4353</to_glass_id>
    (a) Request    <date>2011/04/24</date>
                     <time>13:12:16:100</time>
                    </head>
                    <body>
                     <action>request</action>
                     <object>terminal_position</object>
                    </body>

<xml="xxxxxx.dtd">
                    <head>
                     <to_display_id>tv321</to_display_id>
                     <from_glass_id>X533F4353</from_glass_id>
    (b) Respond    <date>2011/04/24</date>
                     <time>13:12:17:200</time>
                    </head>
                    <body>
                     <action>answer</action>
                     <terminal_position="4">
                     <object>RL,RF,LR,LF</object>
                     <terminal_position>
                    </body>
```

FIG. 21

| Function | Position of required electrode | Sampling time |
|---|---|---|
| Eyeglasses-wearing check | RL, RR, LR, LL | 1,000 ms |
| Simplified eyeglasses-wearing check | RL, LR | 5,000 ms |
| Fatigue measurement by convergence | RL, RR, LR, LL | 10 ms |
| Fatigue measurement by the number of eye blinks | (RL, RR) or (LR, LL) | 10 ms |
| ... | | |

- Do you want to utilize simplified eye fatigue monitoring mode?
  [Yes]  [No]
- Do you want to measure fatigue by convergence?
  [Yes]  [No]

FIG. 23

```
Transmit information on required electrode

<xml="xxxxxx.dtd">
    <head>
     <from_display_id>tv321</from_display_id>
     <to_glass_id>X533F4353</to_glass_id>
     <date>2011/04/24</date>
      <time>13:12:16:100</time>
    </head>
    <body>
      <action>request</action>
      <object>RL,RF,LR,LF</object>
    </body>
```

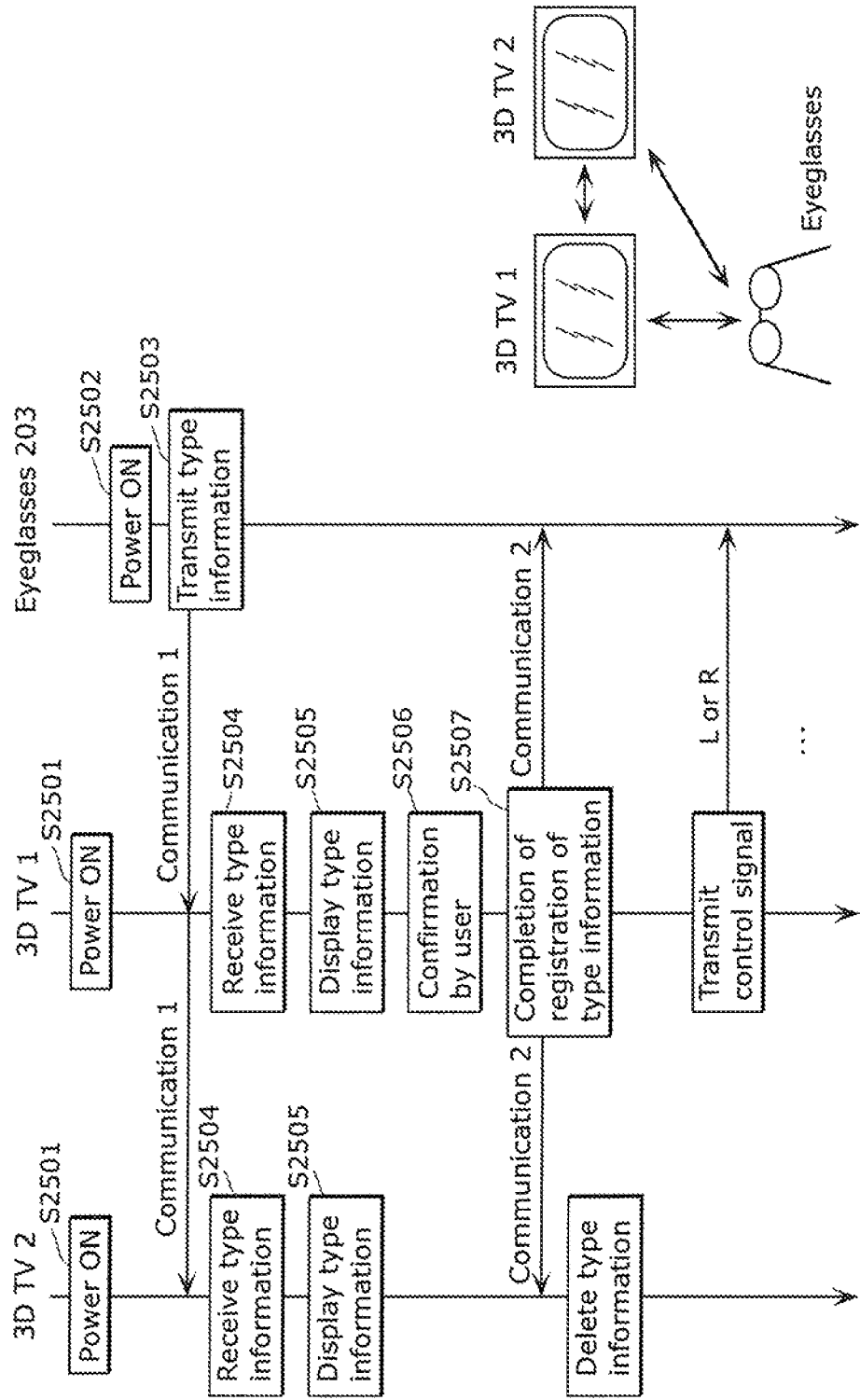

FIG. 26

(a) Request by eyeglasses 324AS89732 for registration

```
<xml="xxxxxx.dtd">
<head>
  <glass_id>324AS89732</glass_id>
  <glass_model>PX1</glass_model>
  <glass_model_id>PX1-342</glass_model_id>
</head>
<body>
  <glass_open>1</glass_open>
  <action>poweron</action>
</body>
```

(b) Paired communication of TV tv 321 and eyeglasses 324AS89732

```
<xml="xxxxxx.dtd">
<head>
  <from_display_id>tv321</from_display_id>
  <to_glass_id>324AS89732</to_glass_id>
  <date>2011/04/24</date>
  <time>13:12:16:100</time>
</head>
<body>
  <action>connect</action>
</body>
```

FIG. 27

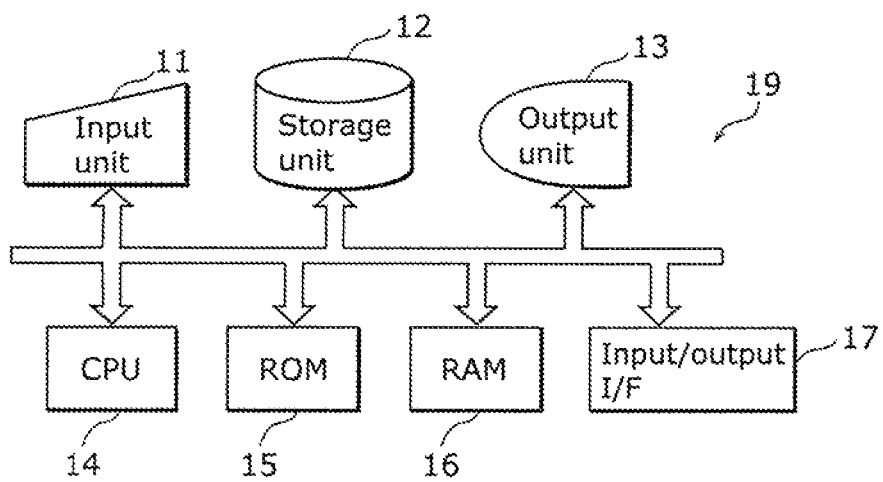

THREE-DIMENSIONAL IMAGE DISPLAY SYSTEM, THREE-DIMENSIONAL IMAGE DISPLAY METHOD, AND THREE-DIMENSIONAL EYEGLASSES

CROSS REFERENCE TO RELATED APPLICATIONS

This is a continuation application of PCT Patent Application No. PCT/JP2012/002908 filed on Apr. 27, 2012, designating the United States of America, which is based on and claims priority of Japanese Patent Application No. 2011-113165 filed on May 20, 2011. The entire disclosures of the above-identified applications, including the specifications, drawings and claims are incorporated herein by reference in their entirety.

FIELD

One or more exemplary embodiments disclosed herein relate generally to three-dimensional image display systems which present three-dimensional images to viewers, and, in particular, to a three-dimensional image display system which includes a display device which displays a three-dimensional image, and three-dimensional eyeglasses which have a function of measuring a biopotential.

BACKGROUND

Three-dimensional (Hereinafter, also referred to as "3D".) videos are becoming popular not only as large screen movies but also as TV content and game footage with the growing popularity of household three-dimensional TVs and computer displays. A three-dimensional video gives a viewer illusion as if the video has depth by creating a disparity between respective images presented to the right and left eyes. Unlike the conventional two-dimensional (Hereinafter, also referred to as "2D".) videos, when viewing a three-dimensional video, the right eye and the left eye move along with the depth of a subject. In other words, when the depth is small and the subject appears projected forward, the left and right eyes move in a direction in which the viewer goes cross-eyed, when the depth is great and the subject appears at far distance, a state of the eyes is close to a state in which the eyes look straight ahead. On the other hand, because the position of a display remains fixed, the viewer is required to continuously be focused at the position of the display for clear viewing. Thus, the focal length of the video is fixed to the position of the display. Due to such conflict between the focal length and the eye movement to the virtual depth of the subject, it is conceived that physical symptoms such as fatigue and video-induced motion sickness may appear in the viewer involved with viewing a stereoscopic video. Thus, conventionally, the viewer fatigue is determined, in PTL 1, by measuring the optical characteristics of the viewer's eyes viewing the three-dimensional video.

On the other hand, to present different images to the left and right eyes using one display, it is necessary to use dedicated eyeglasses (Hereinafter, also referred to as "three-dimensional eyeglasses", or simply referred to as "eyeglasses.") and use shutters to select light directed to the left and right eyes. Switching the shutters in synchronization with right-eye and left-eye screen displays at a sufficiently high frequency allows the viewer to perceive a stereoscopic view, fusing information to the eyes without noticing that the right-eye and left-eye images are being switching.

Meanwhile, during the display of the three-dimensional video, when a viewer sees the display without wearing the dedicated eyeglasses, the viewer not only cannot perceive the stereoscopic view but also sees double imaging. Thus, in PTL 2, to assuredly achieve a stereoscopic view, whether a viewer is wearing the dedicated eyeglasses is sensed in contact or non-contact with the dedicated eyeglasses, and the dedicated eyeglasses transmit a signal indicative of the wearing conditions to a display device which controls video display, such as TV, computers, and game consoles. This controls the switching of the two-dimensional video display and the three-dimensional video display in the display device.

CITATION LIST

Patent Literature

[PTL 1] Japanese Unexamined Patent Application Publication No. 2006-305325
[PTL 2] Japanese Unexamined Patent Application Publication No. 2010-154533

SUMMARY

Technical Problem

However, under the technology disclosed in PTL 2, there is a problem that the wearing conditions of three-dimensional eyeglasses can be determined only in a combination of a display device and standard three-dimensional eyeglasses attached to the display device.

Thus, one non-limiting and exemplary embodiment provides a three-dimensional image display system which can provide a function using a biometric sensor mounted on three-dimensional eyeglasses even when three-dimensional eyeglasses different from the standard three-dimensional eyeglasses attached to the display device are used.

Solution to Problem

In one general aspect, the techniques disclosed here feature a three-dimensional image display system for presenting a three-dimensional image to a viewer, the three-dimensional image display system including: a display device for alternately displaying a right-eye image and a left-eye image; and three-dimensional eyeglasses including a left-eye shutter and a right-eye shutter for being worn by the viewer over face or head and setting the left-eye shutter to an open state when the left-eye image is displayed on the display device and setting the right-eye shutter to the open state when the right-eye image is displayed on the display device, wherein the three-dimensional eyeglasses include: a type information transmission unit configured to transmit type information identifying a type of the three-dimensional eyeglasses to the display device; a potential measurement unit configured to measure a biopotential of the viewer using one or more electrodes mounted on the three-dimensional eyeglasses; and a potential information transmission unit configured to transmit, as potential information, information on the biopotential measured by the potential measurement unit to the display device, and the display device includes: a type information reception unit configured to receive the type information transmitted from the type information transmission unit; an electrode position determination unit configured to refer to electrode position information indicative of a plurality of pairs of the type information and electrode position information indicative of a position of an electrode included in three-dimensional eyeglasses that have the type information, to extract electrode position information corresponding to the type information received by the type information reception unit, and, based on the extracted electrode position information, determine the position of each of the one or more electrodes included in the three-dimensional eyeglasses, the type information and the electrode position information being previously associated with each other; a potential information reception unit configured to receive the potential information transmitted from the potential information transmission unit; and a wearing conditions determination unit configured to associate the position of each of the one or more electrodes and the biopotential indicated by the potential information, based on the position of each of the one or more electrodes determined by the electrode position determination unit and the potential information received by the potential information reception unit, to determine wearing conditions of the viewer wearing the three-dimensional eyeglasses.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

According to the present disclosure, even when the three-dimensional eyeglasses different from the standard three-dimensional eyeglasses attached to the display device are used, the function using the biometric sensors mounted on the three-dimensional eyeglasses is provided by bidirectional communications between the three-dimensional eyeglasses and the display device.

BRIEF DESCRIPTION OF DRAWINGS

These and other advantages and features will become apparent from the following description thereof taken in conjunction with the accompanying Drawings, by way of non-limiting examples of embodiments of the present disclosure. In the Drawings:

FIG. 2 is a diagram showing the hardware configuration of the three-dimensional image display system according to the embodiment.

FIG. 3 is a diagram showing an example of type information registered with eyeglasses.

FIG. 4 is a diagram showing an example communication content in communication 1.

FIG. 5 is a diagram showing an example of electrode mounting positions (electrode information) with respect to types of the eyeglasses.

FIG. 9 is a diagram showing an example communication content in communication 2.

FIG. 10 is a diagram showing an example of electrode information stored in a wearing determination electrode storage unit.

FIG. 12 is a diagram showing an example of communication content for controlling shatters of the eyeglasses.

FIG. 19 is a diagram showing an example of communication content for checking positions of electrodes.

FIG. 21 is a diagram showing an example of function-electrode associated information stored in a function-electrode associated information storage unit.

FIG. 22 is a diagram showing a screen for confirmation of the functions of the display device.

FIG. 23 is a diagram showing an example of communication content for notifying information on required electrodes.

FIG. 25A is a diagram showing an example of a communication sequence between eyeglasses and two display devices.

FIG. 26 is a diagram showing an example of communication content for confirming the registration of the eyeglasses.

FIG. 27 is a block diagram of a hardware configuration used for implementing, by a computer system, a three-dimensional display TV in the three-dimensional image display system according to the embodiment.

DESCRIPTION OF EMBODIMENTS (Findings by Inventors)

Figure 1:
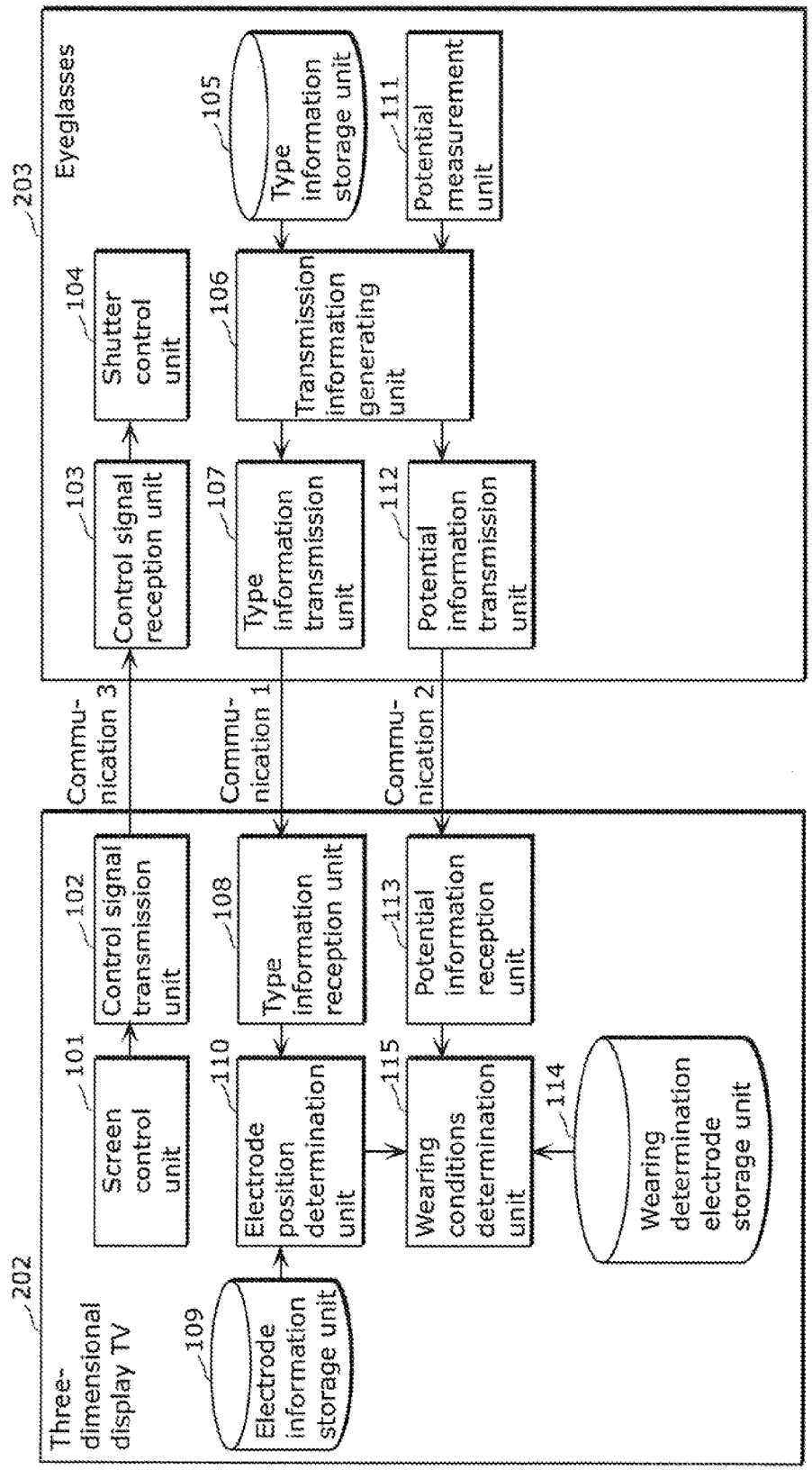
FIG. 1 is a diagram showing an example configuration of a three-dimensional image display system according to an exemplary embodiment.

In recent years, with the growing popularity of 3D TVs, display devices are sold by multiple manufacturers. Furthermore, common eyeglasses are used for stereoscopic video viewing in personal computer displays, display devices such as TVs which play packaged content of broadcasts and videos, and for viewing at movie theaters. Thus, the popularity of stereoscopic video viewing using eyeglasses in various situations requires for bidirectional communications between the display device and the eyeglasses to control the display devices, according to the eyeglasses worn by viewers.

On the other hand, mounting biometric sensors such as electrodes on the eyeglasses worn by a viewer allows for the detection of a viewer state. However, the shapes of the eyeglasses are different and the release date is different, depending on the manufacturer. Therefore, specifications of the eyeglasses are different, such as different number of biometric sensors mounted on the eyeglasses or different functions of biometric sensors.

Thus, the inventors have devised a three-dimensional image display system which can provide, even when three-dimensional eyeglasses different from standard three-dimensional eyeglasses attached to the display device are used, the function using biometric sensors mounted on the three-dimensional eyeglasses by the eyeglasses and the display device performing bidirectional communications therebetween.

A three-dimensional image display system according an exemplary embodiment disclosed herein is a three-dimensional image display system for presenting a three-dimensional image to a viewer, the three-dimensional image display system including: a display device for alternately displaying a right-eye image and a left-eye image; and three-dimensional eyeglasses including a left-eye shutter and a right-eye shutter for being worn by the viewer over face or head and setting the left-eye shutter to an open state when the left-eye image is displayed on the display device and setting the right-eye shutter to the open state when the right-eye image is displayed on the display device, wherein the three-dimensional eyeglasses include: a type information transmission unit configured to transmit type information identifying a type of the three-dimensional eyeglasses to the display device; a potential measurement unit configured to measure a biopotential of the viewer using one or more electrodes mounted on the three-dimensional eyeglasses; and a potential information transmission unit configured to transmit, as potential information, information on the biopotential measured by the potential measurement unit to the display device, and the display device includes: a type information reception unit configured to receive the type information transmitted from the type information transmission unit; an electrode position determination unit configured to refer to electrode information indicative of a plurality of pairs of the type information and electrode position information indicative of a position of an electrode included in three-dimensional eyeglasses that have the type information, to extract electrode position information corresponding to the type information received by the type information reception unit, and, based on the extracted electrode position information, determine the position of each of the one or more electrodes included in the three-dimensional eyeglasses, the type information and the electrode position information being previously associated with each other; a potential information reception unit configured to receive the potential information transmitted from the potential information transmission unit; and a wearing conditions determination unit configured to associate the position of each of the one or more electrodes and the biopotential indicated by the potential information, based on the position of each of the one or more electrodes determined by the electrode position determination unit and the potential information received by the potential information reception unit, to determine wearing conditions of the viewer wearing the three-dimensional eyeglasses.

According to the configuration, the standard three-dimensional eyeglasses even when three-dimensional eyeglasses different from standard three-dimensional eyeglasses attached to the display device are used, the bidirectional communication between the three-dimensional eyeglasses and the display device can provide functionality (checking of the wearing conditions) using the biometric sensor mounted on the three-dimensional eyeglasses.

In other words, conventionally, the shapes of the eyeglasses are different and the release date is different, depending on the manufacturer. Therefore, specifications of the eyeglasses are different, such as different number of biometric sensors mounted on the eyeglasses or different functions of biometric sensors. According to the present disclosure, the type information of the three-dimensional eyeglasses used by the viewer is transmitted from the three-dimensional eyeglasses to the display device, and, based on the received type information, the display device can recognize the positions of the electrodes mounted on the three-dimensional eyeglasses. Thus, the functionality (checking the wearing conditions) fit to the three-dimensional eyeglasses in use by the viewer can be provided.

Herein, as a specific example of confirming the wearing conditions, when a biopotential at at least one electrode mounted at a predetermined position on the three-dimensional eyeglasses exceeds a predetermined value, the wearing conditions determination unit may determine, as the wearing conditions, that three-dimensional eyeglasses are worn by the viewer.

According to the configuration, accurate determination is performed, determining that the three-dimensional eyeglasses are worn by the viewer when potential is occurred at the electrode.

Moreover, the display device may further include an electrode information request transmission unit configured to make a request to the three-dimensional eyeglasses to transmit the electrode position information indicative of the position of each of the one or more electrodes included in the three-dimensional eyeglasses when the type information received by the type information reception unit is not in the electrode information, the three-dimensional eyeglasses may further include: an electrode information request reception unit configured to receive the request from the electrode information request transmission unit; and an electrode position transmission unit configured to transmit, to the display device, the electrode position information indicative of the position of each of the one or more electrodes included in the three-dimensional eyeglasses when the electrode information request reception unit receives the request, and the wearing conditions determination unit may further determine the wearing conditions, based on the position of each of the one or more electrodes indicated by the electrode position information transmitted by the electrode position transmission unit and the potential information received by the potential information reception unit.

According to the configuration, even if the received type information is not registered with the display device, the positions of the electrodes mounted on the three-dimensional eyeglasses are notified to the display device, based on the request from the display device. Thus, the wearing conditions of the eyeglasses can be determined by the display device.

Moreover, the display device may further include: a function-electrode associated information storage unit configured to pre-store function-electrode associated information in which functions of the display device which use the biopotential at the one or more electrodes mounted on the three-dimensional eyeglasses and electrode position information indicative of a position of an electrode used for the functions are associated with each other; and a function determination unit configured to refer to the function-electrode associated information stored in the function-electrode associated information storage unit to identify a function associated with the electrode position information indicative of the position of each of the one or more electrodes determined by the electrode position determination unit, to determine a function achievable by the display device, from among the functions stored in the function-electrode associated information storage unit.

According to the configuration, a function appropriate for the electrode mounted on the eyeglasses is dynamically determined based on function-electrode associated information defining the association between the functionality of the display device and the electrode position information.

As a use example of the determined function, for example, the display device further may include: an electrode selection unit configured to select at least one electrode as the electrode required for achieving the function determined by the function determination unit, from among the one or more electrodes mounted on the three-dimensional eyeglasses; and an electrode information transmission unit configured to transmit electrode information specifying the at least one electrode selected by the electrode selection unit to the three dimensional eyeglasses. The three-dimensional eyeglasses then may further include an electrode information reception unit configured to receive the electrode information transmitted from the electrode information transmission unit, and the potential information transmission unit may transmit, to the display device, the potential information on the biopotential measured at the at least one electrode specified by the electrode information received by the electrode information reception unit, among the potential information obtained by the potential measurement unit measuring the biopotential.

According to the configuration, the three-dimensional eyeglasses notify the display device of the potential information on an electrode required to perform the function determined by the display device, and the display device assuredly implements the determined functionality.

Moreover, the display device may further include: a confirmation information display unit configured to, when the type information reception unit receives the type information, display the received type information; and a registration information transmission unit configured to transmit, to another display device, notification that the display device and the three-dimensional eyeglasses are to operate in cooperation, when there is input from the viewer for display by the confirmation information display unit.

According to the configuration, the other display devices are notified of a fact that the display device confirmed by the viewer and the three-dimensional eyeglasses operate in cooperation. Thus, even if the three-dimensional eyeglasses are used in a situation where there is a plurality of display devices, the three-dimensional eyeglasses can operate in cooperation only with a display device intended by the viewer. For example, the three-dimensional eyeglasses worn by the viewer control the left-eye and the right-eye shutters in cooperation only with a control signal from the display device intended by the viewer. Thus, the viewer can properly view the three-dimensional video presented on, the intended display device even under situations where there is a plurality of display devices.

Moreover, a three-dimensional image display method according an exemplary embodiment disclosed herein is a three-dimensional image display method by a three-dimensional image display system for presenting a three-dimensional image to a viewer, the three-dimensional image display system including: a display device for alternately displaying a right-eye image and a left-eye image; and three-dimensional eyeglasses including a left-eye shutter and a right eye shutter for being worn by the viewer over face or head and setting the left-eye shutter to an open state when the left-eye image is displayed on the display device and setting the right-eye shutter to the open state when the right-eye image is displayed on the display device, the three-dimensional image display method including: transmitting, by the three-dimensional eyeglasses, type information identifying a type of the three-dimensional eyeglasses to the display device; receiving, by the display device, the transmitted type information; referring, by the display device, to electrode information indicative of a plurality of pairs of the type information and electrode position information indicative of a position of an electrode included in three-dimensional eyeglasses, to extract electrode position information corresponding to the received type information and, based on the extracted electrode position information, determining a position of each of one or more electrodes included in the three-dimensional eyeglasses, the type information and the electrode position information being previously associated with each other; measuring, by the three-dimensional eyeglasses, a biopotential of the viewer using the one or more electrodes mounted on the three-dimensional eyeglasses; transmitting, by the three-dimensional eyeglasses, information on the measured biopotential, as potential information, to the display device; receiving, by the display device, the transmitted potential information; and associating, by the display device, the determined position of each of the one or more electrodes and the biopotential indicated by the potential information, based on the determined position of each of the one or more electrodes and the received potential information, to determine wearing conditions of the viewer wearing the three-dimensional eyeglasses.

According to the configuration, the type information of the three-dimensional eyeglasses used by the viewer is transmitted from the three-dimensional eyeglasses to the display device, and, based on the received type information, the display device can recognize the positions of the electrodes mounted on the three-dimensional eyeglasses. Thus, the functionality (checking the wearing conditions) fit to the three-dimensional eyeglasses in use by the viewer can be provided.

Moreover, three-dimensional eyeglasses according an exemplary embodiment disclosed herein are three-dimensional eyeglasses for being worn by a viewer over face or head and operating in cooperation with a display device, the three-dimensional eyeglasses including: a right-eye shutter and a left-eye shutter, states of which are switchable between an open state and a dosed state; a type information transmission unit configured to transmit, to the display device, type information identifying a type of the three-dimensional eyeglasses; a potential measurement unit configured to measure a biopotential of the viewer using one or more electrodes mounted on the three-dimensional eyeglasses; and a potential information transmission unit configured to transmit, as potential information, information on the biopotential measured by the potential measurement unit to the display device.

According to the configuration, the type information of the three-dimensional eyeglasses used by the viewer is transmitted from the three-dimensional eyeglasses to the display device, and, based on the received type information, the display device can recognize the positions of the electrodes mounted on the three-dimensional eyeglasses. Thus, the functionality (checking the wearing conditions) fit to the three-dimensional eyeglasses in use by the viewer can be provided.

Moreover, the three-dimensional eyeglasses may further include: an electrode information request reception unit configured to receive, from the display device, a request for transmission of electrode position information indicative of the position of each of the one or more electrodes included in the three-dimensional eyeglasses; and an electrode position transmission unit configured to transmit the electrode position information indicative of the position of each of the one or more electrodes included in the three-dimensional eyeglasses to the display device, when the electrode information request reception unit receives the request.

According to the configuration, the positions of the electrodes mounted on the three-dimensional eyeglasses are notified to the display device, based on the request from the display device. Thus, the display device can know the positions of the electrodes mounted on the three-dimensional eyeglasses even if the display device cannot recognize eyeglasses identifier, thereby providing the functionality using a biopotential.

Moreover, the three-dimensional eyeglasses may further include an electrode information reception unit configured to receive, from the display device, information specifying at least one electrode selected from among the one or more electrodes mounted on the three-dimensional eyeglasses, wherein the potential information transmission unit may transmit, to the display device, the potential information on the biopotential measured at the at least one electrode specified by the information received by the electrode information reception unit, from among the information on the biopotential measured by the potential measurement unit.

According to the configuration, only the potential information on the biopotential measured at the electrode selected by the display device is transmitted to the display device. Thus, the display device can provide the enhanced functionality using the potential information on the electrode of the display device's own choosing.

The present disclosure can be implemented not only as the three-dimensional image display system, the three dimensional image display method, and the three-dimensional eyeglasses, but also as a program for a display device included in the three-dimensional image display system.

These general and specific aspects may be implemented using a system, a method, an integrated circuit, a computer program, or a computer-readable recording medium such as a CD-ROM, or any combination of systems, methods, integrated circuits, computer program, or computer-readable recording media.

Hereinafter, certain exemplary embodiments are described in greater detail with reference to the accompanying Drawings. It should be noted that an embodiment and variations thereof described below are each merely a preferred illustration of the present disclosure. Values, shapes, materials, components, disposition or a form of connection between the components, steps, and the order of the steps are merely illustrative, and are not intended to limit the present disclosure. The present disclosure is indicated by the appended claims. Thus, among components of the below embodiment and variations thereof, components not set forth in the independent claims indicating the to level concept of the present disclosure are not necessary to achieve the present disclosure but will be described as any components for preferable embodiments.

Embodiment

First, an embodiment of a three-dimensional image display system, a three-dimensional image display method, and three-dimensional eyeglasses according to the present disclosure will be described.

The present embodiment provides a three-dimensional image display system which inspects not only the open and closed states of 3D eyeglasses but also the mounting conditions of electrodes to determine whether a viewer is wearing the eyeglasses.

An example configuration of the three-dimensional image display system according to the present embodiment is shown in FIG. 1.

The three-dimensional image display system according to the present embodiment includes a three-dimensional display TV 202 by way of example of a display device having a screen, and three-dimensional eyeglasses 203 having a biometric sensor mounted thereon by way of example of three-dimensional eyeglasses.

The three-dimensional display TV 202 is a television set which includes a function of three-dimensional display, that is, a function of alternately displaying a right-eye image and a left-eye image on the screen, and includes a screen control unit 101, a control signal transmission unit 102, a type information reception unit 108, an electrode position determination unit 110, an electrode information storage unit 109, a potential information reception unit 113, a wearing conditions determination unit 115, and a wearing determination electrode storage unit 114. The eyeglasses 203 have a left-eye shutter and a right-eye shutter and are three-dimensional eyeglasses which are worn by a viewer over the face or over the head. The eyeglasses 203 set the left-eye shutter to an open state when the left-eye image is displayed on the three-dimensional display TV 202, and set the right-eye shutter to the open state when the right-eye image is displayed on the three-dimensional display TV 202. The eyeglasses 203 include a control signal reception unit 103, a shutter control unit 104, a type information storage unit 105, a transmission information generating unit 106, a type information transmission unit 107, a potential measurement unit 111, and a potential, information transmission unit 112.

In FIG. 1, the screen control unit 101 is a processing unit which controls whether the right-eye image is to be presented or the left-eye image is to be presented to the viewer on the screen of the three-dimensional display TV 202.

The control signal transmission unit 102 is a communication unit which transmits to the eyeglasses 203 a control signal for controlling the eyeglasses 203 for an image controlled by the screen control unit 101.

The control signal reception unit 103 is communication unit which receives the control signal transmitted from the control signal transmission unit 102.

The shutter control unit 104 is a processing unit which controls lens shutters (the right-eye shutter and the left-eye shutter) of the eyeglasses 203, according to the control signal received by the control signal reception unit 103.

The type information storage unit 105 is a memory or the like pre-storing type information for identification of the type of the eyeglasses 203.

The transmission information generating unit 106 is a processing unit which processes information to be transmitted from the eyeglasses 203 to a display device such as the three-dimensional display TV 202 into transmission information that can be received and interpreted by the three-dimensional display TV 202.

The type information transmission unit 107 is a communication unit which transmits information (the transmission information) obtained by the transmission information generating unit 106 processing the type information stored in the type information storage unit 105 to a display device such as the three-dimensional display TV 202.

The type information reception unit 108 is a communication unit which receives the type information transmitted from the type information transmission unit 107.

The electrode information storage unit 109 pre-stores the electrode information indicative of plural sets of previously associated type information of the eyeglasses and the electrode position information indicative of positions of electrodes included in the eyeglasses that have the type information. In other words, the electrode information storage unit 109 is a memory or the like storing information items, such as the electrode mounting positions, associated with the type information items of many types of eyeglasses.

The electrode position determination unit 110 is a processing unit which refers to the electrode information stored in the electrode information storage unit 109 to extract electrode position information associated with the type information received by the type information reception unit 108, and, based on the extracted electrode position information, determine the positions of the electrodes included in the eyeglasses 203. In other words, the electrode position determination unit 110 is a processing unit which searches for the electrode position information stored in the electrode information storage unit 109 and associated with the type information received by the type information reception unit 108 to determine electrodes to be utilized for the measurement of a biopotential (Hereinafter, also simply referred to as "potential.").

The potential measurement unit 111 is a processing unit which measures the biopotential of the viewer, using the electrodes mounted on the eyeglasses 203.

The potential information transmission nit 112 is a communication unit which transmits, to the three-dimensional display TV 202, information (potential information) which is obtained by the transmission information generating unit 106 processing the information on the biopotential measured by the potential measurement unit 111.

The potential information reception unit 113 is a communication unit which receives the potential information transmitted from the potential information transmission unit 112.

The wearing determination electrode storage unit 114 is a memory or the like pre-storing information on the electrodes to be utilized for the determination as to whether the viewer is wearing the eyeglasses.

The wearing conditions determination unit 115 is a processing unit which associates the positions of the electrodes and the biopotential indicated by the potential information, based on the electrode positions determined by the electrode position determination unit 110 and the potential information received by the potential information reception unit 113, to determine the wearing conditions of the viewer wearing the three-dimensional eyeglasses. In the present embodiment, the wearing conditions determination unit 115 determines, from the potential information received by the potential information reception unit 113, potential at an electrode specified by the information stored in the wearing determination electrode storage unit 114, i.e., potential at an electrode monitored for the detection of the wearing conditions of the eyeglasses, among the electrodes determined by the electrode position determination unit 110, to determine whether the viewer is wearing the eyeglasses. Specifically, the wearing conditions determination unit 115 determines that the eyeglasses 203 are worn by the viewer when the biopotential at at least one electrode mounted at a predetermined location is within a predetermined range (in the present embodiment, when at least one of the potentials at the electrodes specified by the information stored in the wearing determination electrode storage unit 114 is within a range specified by the information stored in the wearing determination electrode storage unit 114).

should be noted that some or all the processing units (the screen control unit 101, the control signal transmission unit 102, the control signal reception unit 103, the shutter control unit 104, the transmission information generating unit 106, the type information transmission unit 107, the type information reception unit 108, the electrode position determination unit 110, the potential information transmission unit 112, the potential information reception unit 113, and the wearing conditions determination unit 115) included in the three-dimensional image display system according to the present embodiment may be implemented in a dedicated electronic circuit (i.e., hardware) or a program (i.e., software) executed by a CPU. For example, all or some of the screen control unit 101, the control signal transmission unit 102, the type information reception unit 108, the electrode position determination unit 110, the potential information reception unit 113, and the wearing conditions determination unit 115 included in the three-dimensional display TV 202 may be implemented in an electronic circuit, or may be implemented in a program executed by a CPU (or processor) included in the three-dimensional display TV 202. Likewise, all or some of the control signal reception unit 103, the shutter control unit 104, the transmission information generating unit 106, the type information transmission unit 107, and the potential information transmission unit 112 included in the eyeglasses 203 may be implemented in an electronic circuit or may be a program executed by a CPU (or processor) included in the eyeglasses 203.

Next, an example configuration of hardware on which the three-dimensional image display system according to the present embodiment operates is shown in FIG. 2. In FIG. 2, a DVD player 201 having 3D videos stored therein, and TVs with 3D display capability, i.e., the three-dimensional display TV 202 are in connection. Furthermore, the three-dimensional display TV 202 has an antenna 212 for bidirectional communication installed and can perform bidirectional communications with the eyeglasses 203 having the electrodes mounted thereon. In FIG. 2, the eyeglasses 203 having four electrodes mounted thereon are illustrated. The eyeglasses 203 have left and right lens on which shutters 230 made of liquid crystal are mounted. Moreover, the eyeglasses 203 have a microcomputer (not shown) installed therein. The microcomputer controls the opening, and the closing of the shutter 230 made of liquid crystal, according to a signal from an antenna 213 communicating with the antenna 212 of the three-dimensional display TV 202. Moreover, the biopotential of the viewer can be measured using electrodes 221 to 224 which are mounted on the eyeglasses 203 and in contact with the viewer on the nose or the temple. Using the biopotential, a result of determining, whether the viewer is wearing the eyeglasses or a result of measuring the state of the eye movement of the viewer can also be transmitted to the three-dimensional display TV 202 via the antenna 213.

Next, operation of each module (component) shown in FIG. 1 will be described. In the three-dimensional display TV 202, the screen control unit 101 controls whether the right-eye image is to be presented or the left-eye image is to be presented on the screen of the three-dimensional display TV 202. The control signal transmission unit 102 transmits, to the eyeglasses 203, a control signal for controlling the eyeglasses 203 in synchronization with an image controlled by the screen control unit 101. In the eyeglasses 203, the control signal reception unit 103 receives the control signal transmitted from the control signal transmission unit 102 of the three-dimensional display TV 202. The shutter control unit 104 controls the shutters 230 provided on the lens of the eyeglasses 203, according to the control signal received by the control signal reception unit 103. According to such configurations, the three-dimensional image display system according to the present embodiment presents the right-eye video and the left-eye video to a viewer, allowing the viewer to view a 3D video.

Next, a method for controlling the communications from the eyeglasses 203 to the three-dimensional display TV 202 will be described. The type information storage unit 105 stores the type information which is information identifying the type of the eyeglasses 203. Specifically, for example, as shown in FIG. 3, manufacture date, manufacturer, serial number, eyeglasses model ID, eyeglasses type ID, and so on are stored as the type information of the eyeglasses in the type information storage unit 105. The type information of the eyeglasses is recorded in a ROM or the like when the eyeglasses are manufactured and shipped from the factory. In particular, the eyeglasses type ID can be utilized as an identifier of the function of the eyeglasses. Referring to the identifier allows for the determination of the battery capacity and the number of electrodes that are mounted on the eyeglasses, the mounting locations of the electrodes, and so on. It should be noted that in the present embodiment, the type information uniquely associated with the specification of the electrodes mounted on the eyeglasses is, typically, but not limited to, the eyeglasses type ID. The type information may be eyeglasses model ID, a combination of the eyeglasses model ID and the eyeglasses type ID, or a combination of all or part of information stored in the type information storage unit 105.

The transmission information generating unit 106 processes information, which is to be transmitted from the eyeglasses 203 to a display device such as the three dimensional display TV 202, into the transmission information that can be received and interpreted by the three-dimensional display TV 202. The format used for the transmission from the eyeglasses to the display device is, in many cases, predesigned by the standard or the like, and the information is processed into a format conforming to the standard. Moreover, once the eyeglasses 203 are powered on, the type information transmission unit 107 transmits information (the transmission information), which is obtained by the transmission information generating unit 106 processing the type information stored in the type information storage unit 105, to a display device such as the three-dimensional display TV 202. An example of the processed information is shown in FIG. 4. Shown in (a) of FIG. 4 is the type information of the eyeglasses shown in FIG. 3 processed into an XML format. Alternatively, information defined as a communication packet format as shown in (b) of FIG. 4 may be transmitted.

The type information reception unit 108 receives the type information transmitted from the type information transmission unit 107. For example, the three-dimensional display TV 202 receives the type information shown in FIG. 4 which has been transmitted from the type information transmission unit 107. This allows the three-dimensional display TV 202 to recognize that the eyeglasses 203 for 3D viewing are powered on.

Figure 6:
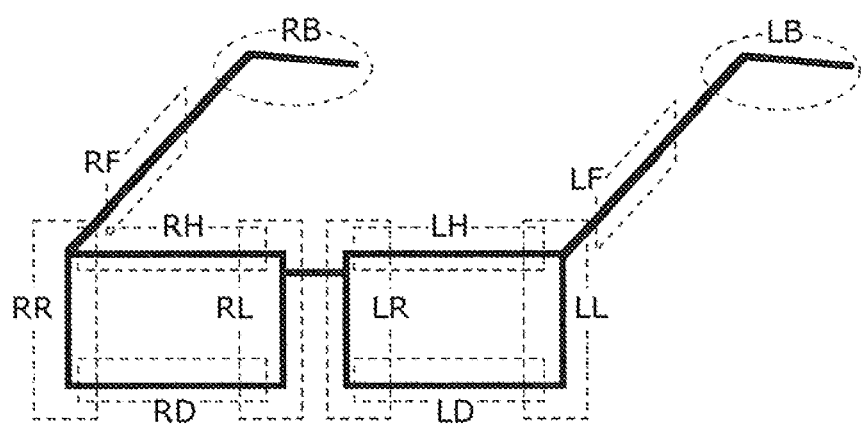
FIG. 6 is a diagram showing an example of standard electrode mounting positions on eyeglasses.

On the other hand, the electrode information storage unit 109 stores the electrode information indicative of plural sets of previously associated type information of the eyeglasses and the electrode position information indicative of positions of electrodes included in the eyeglasses that have the type information. For example, as shown in FIG. 5, the electrode information items not only of the eyeglasses sold packed with the display device such as TVs, but also of eyeglasses of other types are stored. As shown in FIG. 5, in the present embodiment, the electrode information storage unit 109 stores the electrode information which indicates the number ("1", "2") of electrodes (electrodes at "RR", "RL", "RH", "RD", "RF", "RB", "FR", "FL", "FH", "FD", "FF", "FB") mounted on the eyeglasses for each combination of "manufacturer", "eyeglasses model ID", and "eyeglasses type ID". For example, on the second row in the table shown in FIG. 5, it is indicated that the electrodes are mounted at "RL", "RF", "LR", and "LF" on the eyeglasses where the manufacturer is "Company Pa", the eyeglasses model ID is "PX2", and the eyeglasses type ID is "PX2-211". Herein, the positions of the electrodes mounted on the eyeglasses are given characters for each position on the eyeglasses for 3D viewing as shown in FIG. 6, and mounting positions of the electrodes on the eyeglasses can be verified by the characters.

Figure 8:
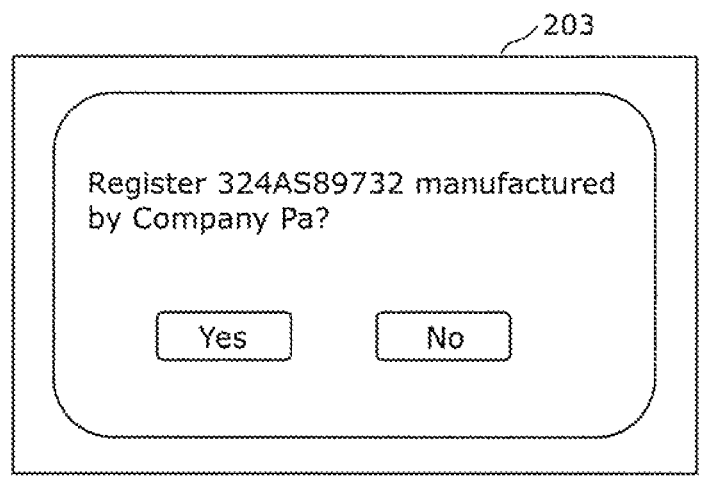
FIG. 8 is a diagram showing an example of screen display prompting the registration of eyeglasses.

Furthermore, the three-dimensional display TV 202 can also check if a video to display is to be viewed using the eyeglasses now powered on by the viewer, by presenting the screen display as shown in (a) of FIG. 8. Moreover, to notify, using the three-dimensional display TV 202, that the eyeglasses type ID of the eyeglasses 203 has been confirmed, the three-dimensional display TV 202 may transmit to the eyeglasses 203 information including ID (ID that can be an address over communication) of the three-dimensional display TV 202, such as data of content shown in (b) of FIG. 8. This allows the eyeglasses 203 to acquire the ID of display device (herein, the three-dimensional display TV 202) which is to be the destination of transmission in the future, and, subsequently, when the eyeglasses 203 transmit data to the three-dimensional display TV 202, information that has a tv 321, which is the ID of the three-dimensional display TV 202, attached thereto is transmitted. Specifying the ID of the display device (herein, the three-dimensional display TV 202) which is to be the destination from the eyeglasses 203 as described above allows a specific display device to be identified for communication even when a plurality of the display devices (such as three-dimensional display TVs) exists, thereby reducing the number of malfunctions.

Figure 7:
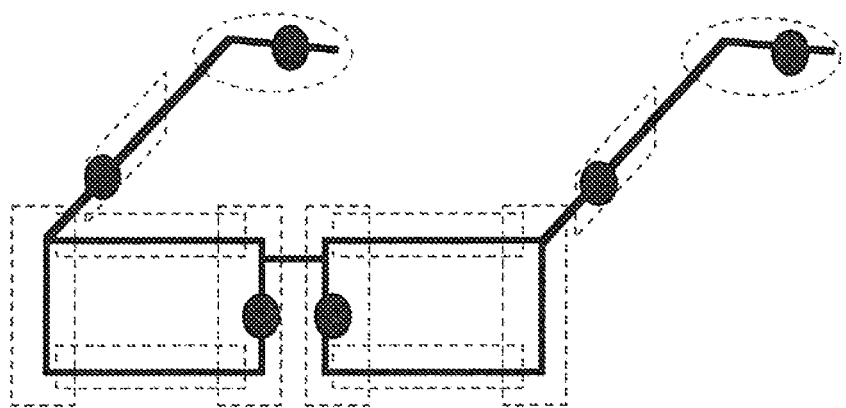
FIG. 7 is a diagram showing an example of electrode mounting positions on certain eyeglasses.

The electrode position determination unit 110 searches for the electrode position information stored in the electrode information storage unit 109 and associated with the type information received by the type information reception unit 108 to determine an electrode to be utilized for the measurement of potential. Specifically, when the type information reception unit 108 has received the type information as shown in FIG. 4, the electrode position determination unit 110 can recognize on the three-dimensional display TV 202 that the eyeglasses type ID of the eyeglasses 203 powered on is "PX1-342". Then, by referring to the eyeglasses the eyeglasses type ID of which is "PX1-342" stored in the electrode information storage unit 109, the electrode position determination unit 110 can know that the eyeglasses have electrodes mounted thereon at locations RL, RF, RB, LR, LF, and LB. In other words, the electrode position determination unit 110 can know that the electrodes mounted on the eyeglasses 203 are disposed as shown in FIG. 7. In such a manner, the eyeglasses 203 originate the type information (the eyeglasses type ID) stored in the eyeglasses 203 when the eyeglasses 203 are powered on, and the three-dimensional display TV 202 pre-stores information on the mounting conditions of the electrodes associated with the type information originated from the eyeglasses 203. Thus, the three-dimensional display TV 202 having received the type information can estimate the positions of the electrodes mounted on the eyeglasses.

The potential measurement unit 111 measures the biopotential of the viewer, using the electrodes mounted on the eyeglasses 203 worn by the viewer. For the eyeglasses 203 according to the present embodiment, six electrodes are mounted on the eyeglasses 203 as shown in FIG. 7, and the potential to the earth ground is measured. In general, the electrodes at RB and LB are measured for the earth ground and reference, and the other four electrodes are measured to obtain potential difference data to the earth ground.

The potential information transmission unit 112 transmits to the three-dimensional display TV 202 information (the potential information) obtained by the transmission information generating unit 106 processing information on the biopotential measured by the potential measurement unit 111 into a format that can be interpreted by the three-dimensional display TV 202. For example, the potential information transmission unit 112 transmits the measured potential information in a data format as shown in (a) of FIG. 9 or in example data as shown in (b) of FIG. 9. Here, the potential information includes data measured at the electrode at RL, data measured at the electrode at LR, or the like. It should be noted that the potential information to be transmitted is not limited to have the XML structure as shown in (b) of FIG. 9, and can be transmitted in a packet format.

The potential information reception unit 113 receives the potential information transmitted from the potential information transmission unit 112. The wearing determination electrode storage unit 114 stores information on the electrodes which are utilized for the determination as to whether the viewer is wearing the eyeglasses. FIG. 10 is a diagram showing an example of the electrode information stored in the wearing determination electrode storage unit 114. Here, "Functional details", which is information in which a plurality of methods for checking if the eyeglasses are worn is discriminated, "Position of required electrode" specifying the electrode to be used to check if the eyeglasses are worn by the viewer, "Sampling time for measurement" indicative of time intervals in the measurement at the electrode, and "Potential state determination" indicative of a threshold value of the biopotential whereby the determination is made as to whether the viewer is wearing the eyeglasses are stored as the information on the electrodes. For example, as shown in FIG. 10, in the case of "Eyeglasses-wearing check 1", the positions of required electrodes are RL, RR, LR, and LL, and if the biopotential is measured at any of the electrodes (more specifically, potential within a range described in "Potential state determination" column, or potential exceeding the lower limit), it is determined that the viewer is wearing the eyeglasses.

Figure 11:
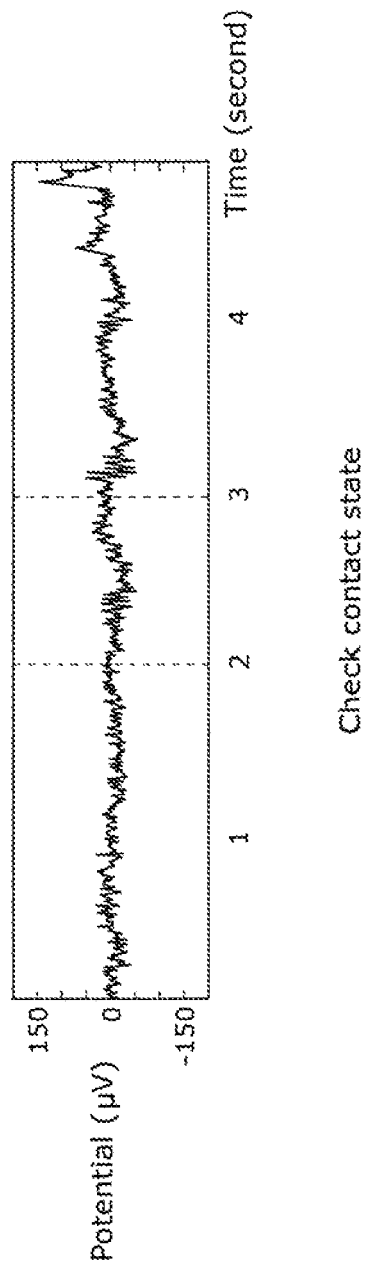
FIG. 11 is a diagram showing example data of a biopotential sensor.

The wearing conditions determination unit 115 refers to the electrode information stored in the wearing determination electrode storage unit 114 to extract the potentials at the electrodes monitored for the detection of the wearing conditions of the eyeglasses 203 from the time-series data of the biopotential received by the potential information reception unit, and determine whether the extracted potential is within the range indicated by "Potential state determination" which is stored in the wearing determination electrode storage unit 114 (or exceeds the lower limit), and, according to the result, the wearing conditions determination unit 115 determines whether the viewer is wearing the eyeglasses 203. Usually, potential data as shown in FIG. 11 is measured at measurement of the biopotential of the viewer. When such data is detected, the wearing conditions determination unit 115 can determine that the viewer has powered on the eyeglasses 203 and further determine that the viewer is wearing the eyeglasses.

Figure 13A:
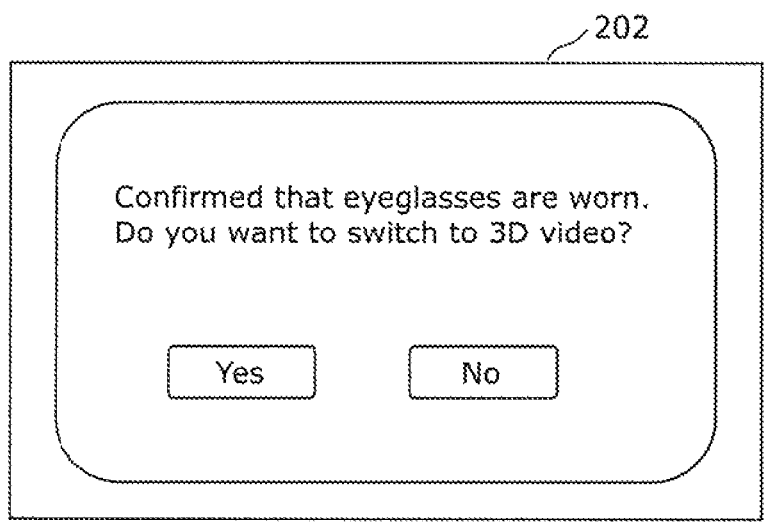
FIG. 13A is a diagram showing an example of the screen display for the confirmation of switching a 20 video to a 3D video.

According to such configuration, when it is determined that the viewer is wearing the eyeglasses, the three-dimensional display TV 202 transmits, from the control signal transmission unit 102, an instruction (control signal) as shown in FIG. 12 to control the sequential switching of the left-eye shutter and the right-eye shutter. FIG. 12 shows an example of the control signal which is transmitted at every 12 ms. It should be noted that when it is determined that the viewer is wearing the eyeglasses, the three-dimensional display TV 202 may first present the viewer with a confirmation message for switching the 2D display to the 3D display as shown in FIG. 13A, and may transmit the control signal to the eyeglasses 203 after input from the viewer is obtained.

<Operational Flow of Overall Three-Dimensional Image Display System>

Figure 13B:
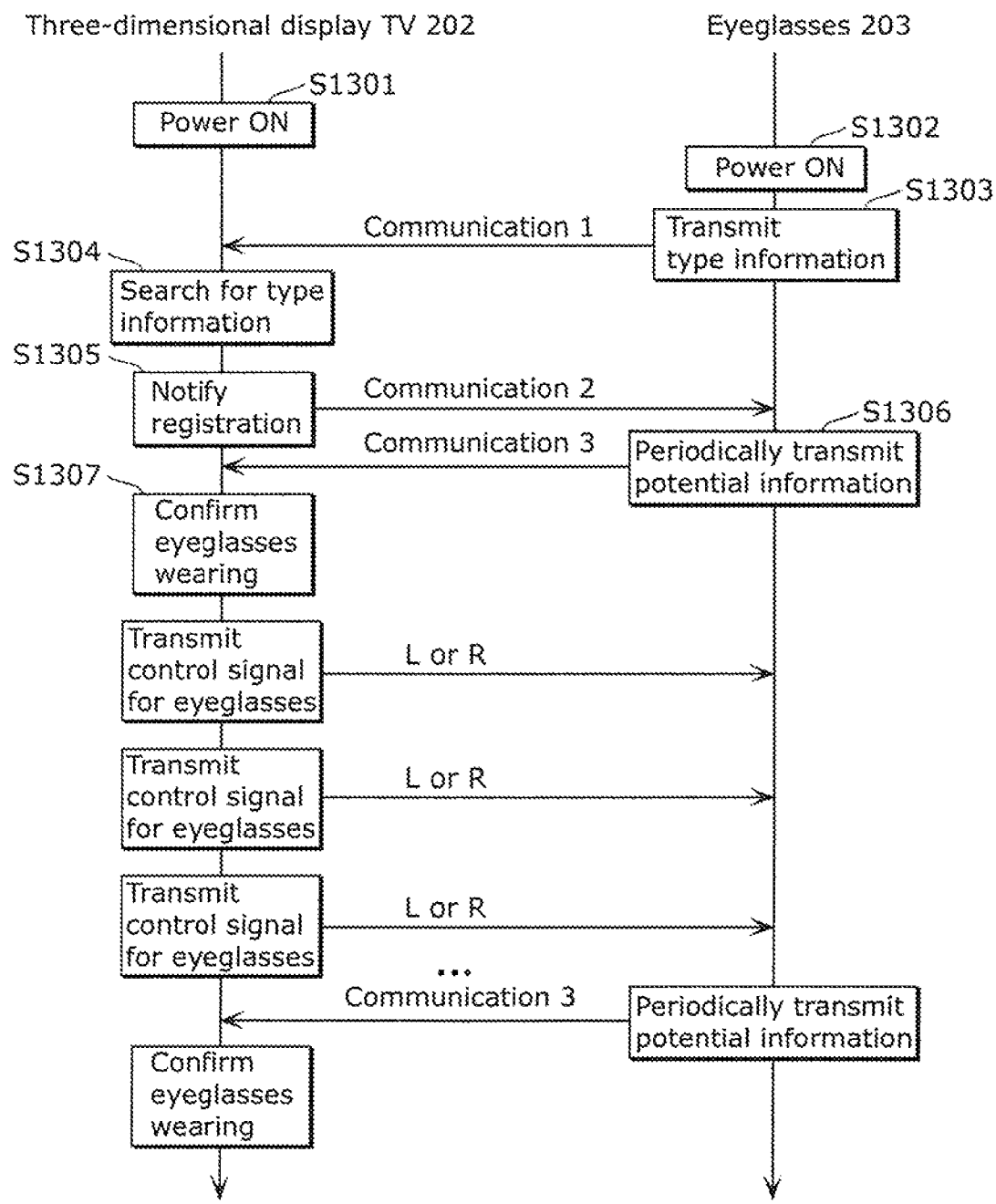
FIG. 13B is a diagram showing an example of bidirectional communications between a display device and eyeglasses.

A communication sequence between the three-dimensional display TV 202 and the eyeglasses 203 is shown in FIG. 13B. In FIG. 13B, the three-dimensional display TV 202 is first powered on (S1301), and then the eyeglasses 203 are powered on (S1302). Once the eyeglasses 203 are powered on, the type information of the eyeglasses is read out from the type information storage unit 105 in the eyeglasses 203 and notified to the three-dimensional display TV 202 (S1303). For example, the type information in a format as shown in FIG. 4 is transmitted (communication 1 in FIG. 13B). In the three-dimensional display TV 202, when the type information reception unit 108 has received the type information, the electrode position determination unit 110 searches through the registered pieces of the type information of the eyeglasses in the electrode information storage unit 109 for the just received type information (S1304). As a result, if the received type information is registered with the electrode information storage unit 109, the three-dimensional display TV 202 transmits a message indicating that the received type information is registered back to the eyeglasses 203 (S1305, communication 2). Here, the three-dimensional display TV 202 transmits, for example, information as shown in (b) of FIG. 8 to the eyeglasses 203. Here, as shown in (b) of FIG. 8, the ID of the three-dimensional display TV 202 that has the type information (or, that has confirmed the registration) registered therewith is also simultaneously transmitted. Thus, the eyeglasses 203 can recognize a display device (the three-dimensional display TV 202 in the present embodiment) to which the eyeglasses 203 will transmit information in the future. "Registration of the type information" refers to a fact that the three-dimensional display TV 202 (such as the electrode position determination unit 110) stores the eyeglasses of the communication party or the type information of the eyeglasses recognized being worn by the viewer in an internal memory unit.

Next, the eyeglasses 203 transmit the information (the potential information) on the potential data of the eyeglasses 203 measured at predetermined intervals to the three-dimensional display TV 202. For example, the eyeglasses 203 transmit the potential information as shown in FIG. 9 to the three-dimensional display TV 202 (S1306, communication 3). The three-dimensional display TV 202 confirms such potential information, allowing the three-dimensional display TV 202 to confirm whether the viewer is wearing the eyeglasses (S1307). Thereafter, in a manner as shown in FIG. 12, the three-dimensional display TV 202 performs the 3D display and transmits, at predetermined intervals, a control signal for controlling the opening and the closing of the shutters of the eyeglasses 203 in a format as shown in FIG. 12.

<Operational Flow of TV>

Figure 14A:
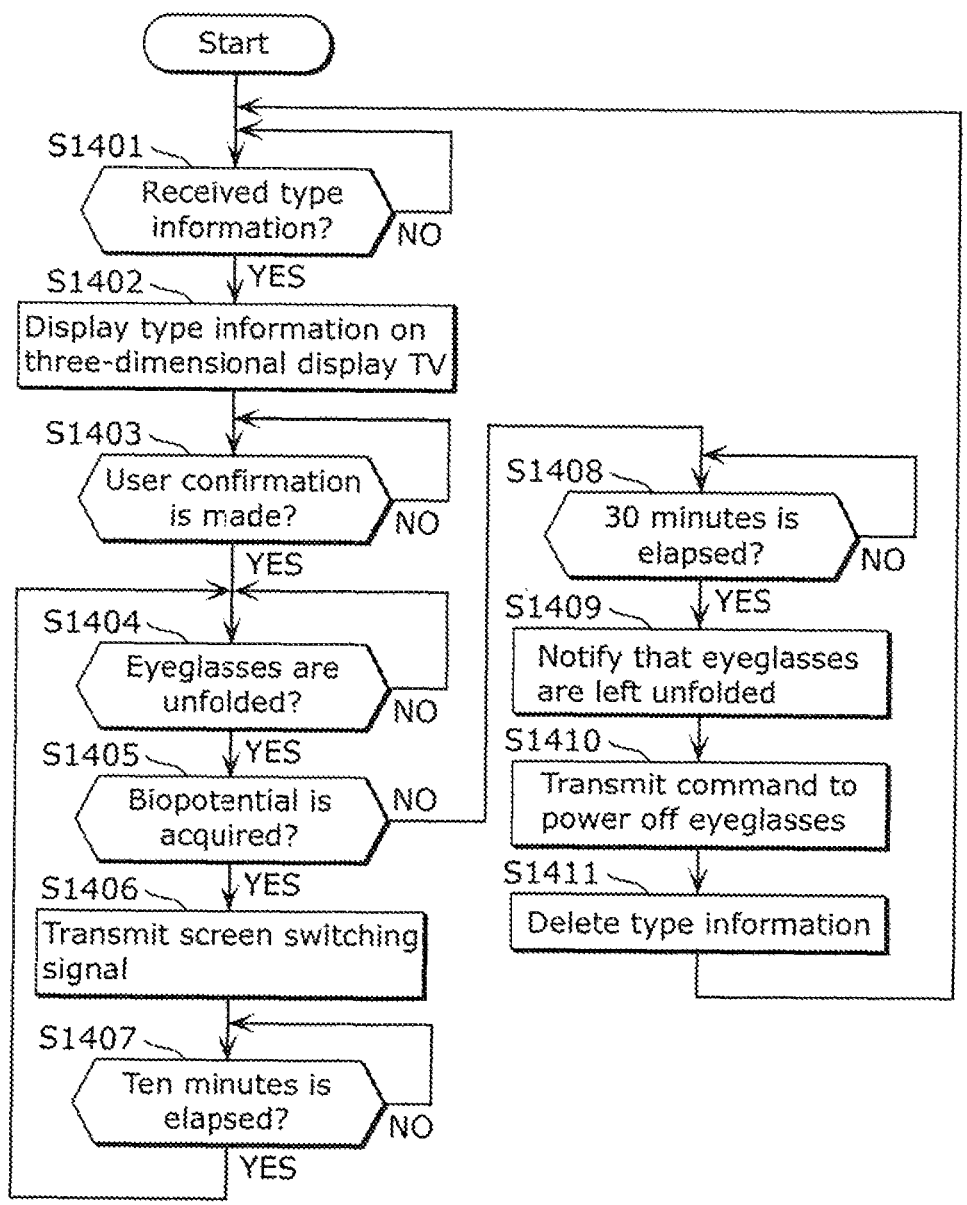
FIG. 14A is a diagram showing the control flow the display device.
Figure 14B:
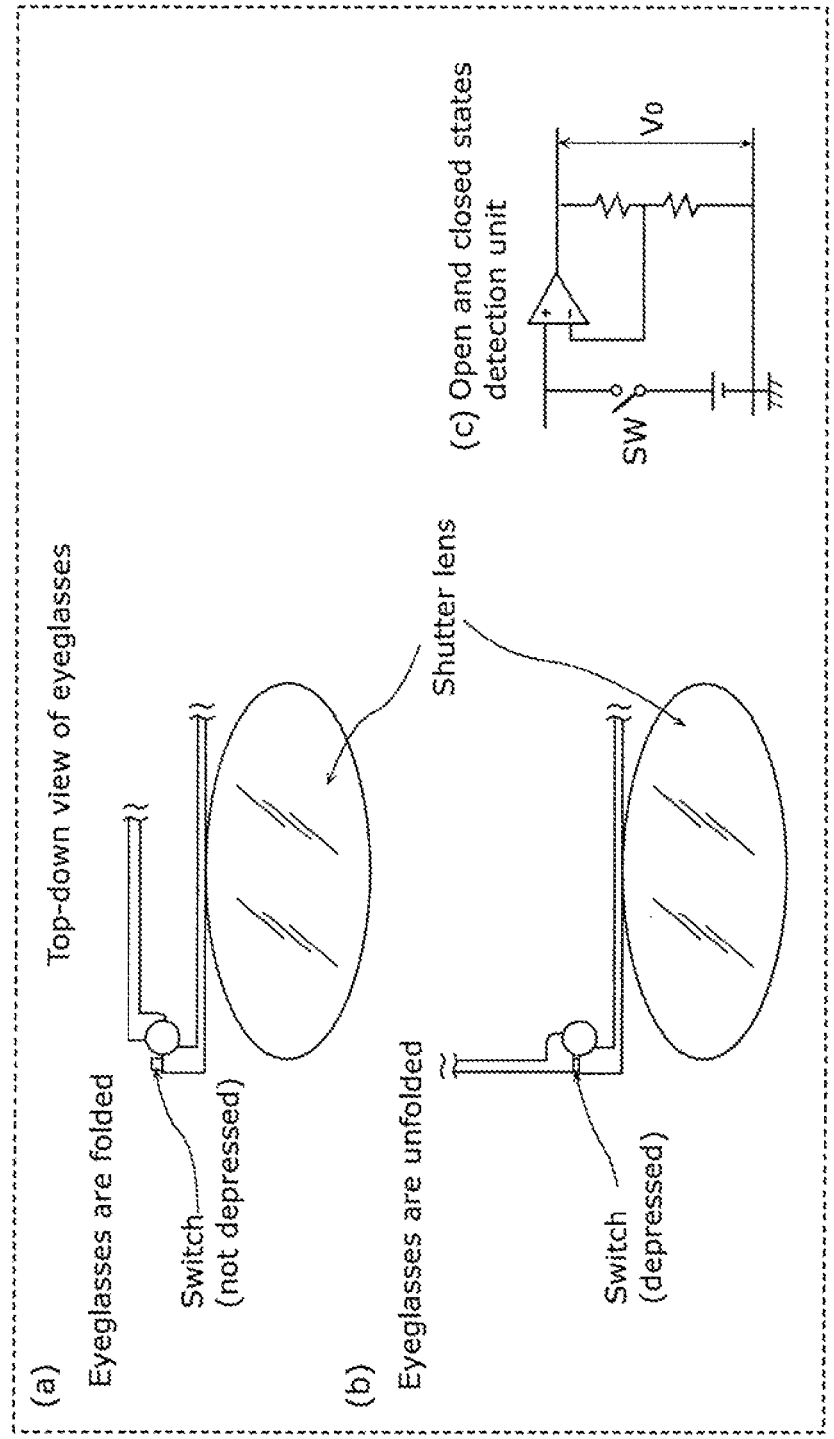
FIG. 14B is a diagram showing an example configuration of a sensor for detecting the open and closed states of the eyeglasses.

FIG. 14A shows the control flow of the three-dimensional display TV 202. First, once powered on, the three-dimensional display TV 202 is in a wait state, waiting for to receive the type information from the eyeglasses 203 (S1401). Next, once received the type information from the eyeglasses 203, the three-dimensional display TV 202 presents the viewer with, for example, registration information confirmation as shown in (a) of FIG. 8 on the screen (S1402). Next, when the viewer gives confirmation input, the processing proceeds to the next step, while when the viewer does not give confirmation input, the step is repeated (S1403). If the eyeglasses 203 have a sensor mounted thereon which can detect the open and closed states ("temples" of the eyeglasses 203 are unfolded and folded, respectively), the three-dimensional display TV 202 receives a communication which is related to the open and closed states from the eyeglasses 203 (S1404). For example, a sensor which detects the open and closed states can be implemented by a mechanism and a circuit shown in FIG. 14B. FIG. 14B shows the mechanism that when "temples" of the eyeglasses 203 placed over the ears are folded, the mounted switches are opened ((a) of 14B), and when "temples" are extended so that the viewer can wear the eyeglasses 203 ("temples" are unfolded), the switches are depressed ((b) of FIG. 14B). Furthermore, a microcomputer detects the open and closed states of the switches by using potential, and amplifies the detected signal by using an amplifier such as an operational amplifier as shown in (c) of FIG. 14B, thereby detecting the open and closed states. Such an electronic circuit (such as amplifier and microcomputer) can be shared with a power source by which the shutters of the eyeglasses 203 are driven, and can be implemented in the frame of the eyeglasses 203. While the open and closed states are detected by push button switches in the example shown in FIG. 14B, a circuit can be implemented in which resistance changes in response to "temple" angles of the eyeglasses 203 due to sliding resistance or the like and the changes in resistance are detected. When the eyeglasses 203 are in the folded state, the step is repeated. When it is detected that the eyeglasses 203 are in the unfolded state, the processing proceeds to the next step, provided that the unfolded state is a state in which the frames of the eyeglasses 203 are unfolded, and can be detected in a manner, for example, that the switches electrically turn on when the eyeglasses fall in the unfolded state.

Next, the three-dimensional display TV 202 determines whether the biopotential is acquired by using the electrodes mounted on the eyeglasses 203 (S1405). In the step, when a predetermined potential difference is measured at a predetermined electrode as also shown in FIG. 10, it is determined that the viewer is wearing the eyeglasses 203. The processing proceeds to S1406 when the biopotential is measured at the electrode of the eyeglasses 203. The processing proceeds to S1408 when the biopotential is not measured.

In the following step, if the eyeglasses 203 are in the unfolded state it is determined that the viewer is wearing the eyeglasses 203. Thus, image signals displayed on the three-dimensional display TV 202 are switched from image signals for 2D video to image signals for 3D video (S1406). Next, after a predetermined time (for example, 10 minutes) has elapsed, the processing returns to S1404, and it is determined whether the biopotential is measured by the electrodes and based on the unfolded and folded states of the eyeglasses 203.

Next, a situation where the biopotential of the eyeglasses 203 is not measured continues for a predetermined time (for example, 30 minutes) while the eyeglasses 203 are unfolded (S1408), the three-dimensional display TV 202 determines and notifies to the viewer on the screen or the like that the eyeglasses 203 are powered on and left unfolded (the viewer is not wearing the eyeglasses 203) (S1409). In contrast, if there is no reaction from the viewer (such as instructions by a remote controller), the three-dimensional display TV 202 determines that the viewer cannot see the screen of the three-dimensional display TV 202, and the three-dimensional display TV 202 transmits to the eyeglasses 203 a command to power off the eyeglasses 203 (S1410). Furthermore, the three-dimensional display TV 202 deletes the registered type information of the eyeglasses (S1411).

According to the three-dimensional image display system of the present embodiment, the three-dimensional display TV 202 can automatically switch the 2D video to the 3D video when the eyeglasses 203 are worn by a viewer, by performing the above operation. Furthermore, when the eyeglasses 203 are left, unwanted depletion of the battery in the eyeglasses 203 can be prevented by automatically powering off the eyeglasses 203.

In recent years, the display device such as the three-dimensional display TV 202 is, in many cases, connected to an external network such as the Internet. Therefore, the electrode information stored in the electrode information storage unit 109 may be sequentially updated via a communication network.

Variation 1 of Embodiment

Next, a variation 1 of the above embodiment will be described.

Figure 16:
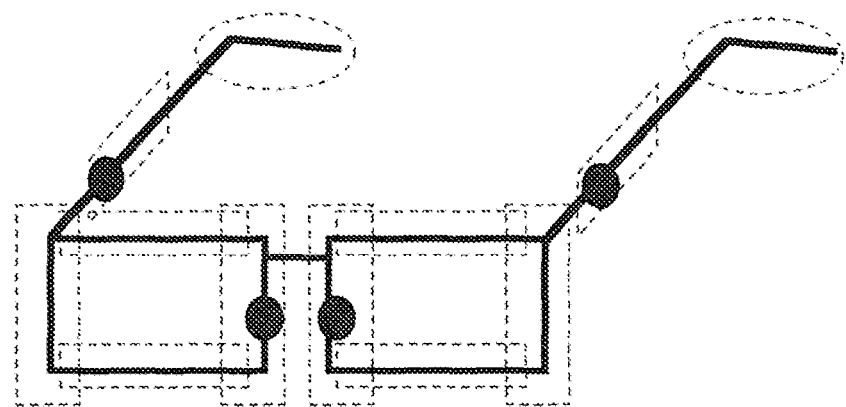
FIG. 16 is a diagram showing an example electrode mounting positions on certain eyeglasses.
Figure 17:
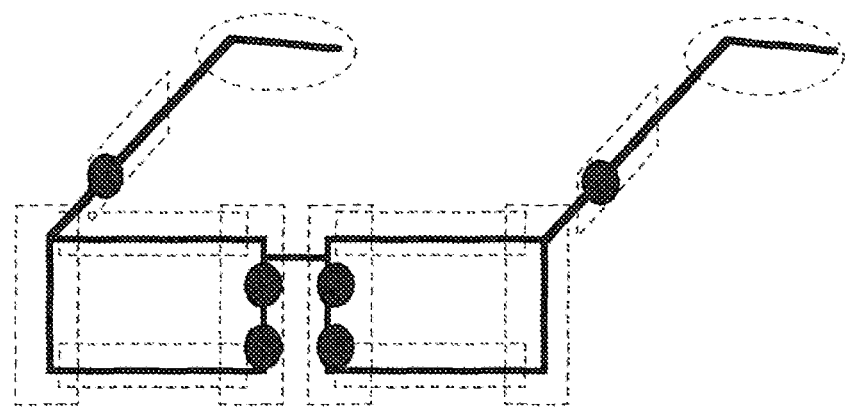
FIG. 17 is a diagram showing an example of electrode mounting positions on certain eyeglasses.
Figure 18:
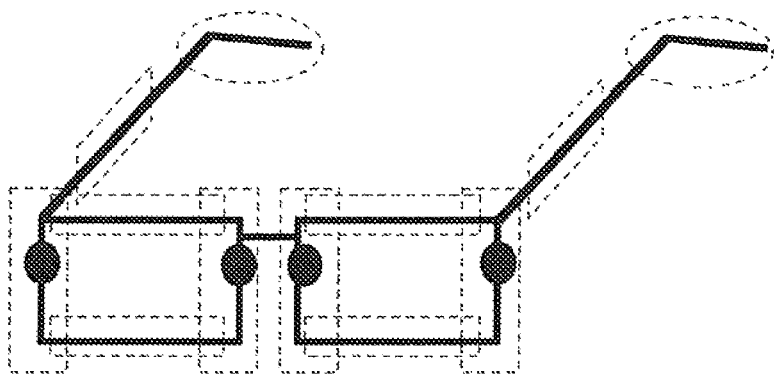
FIG. 18 is a diagram showing electrode mounting positions on eyeglasses and the registration details.

In the above embodiment, the processing flow when the type information of the eyeglasses is registered with the three-dimensional display TV has been described. The type information of the eyeglasses, however, may not be registered with the three-dimensional display TV. Specifically, when the type information received by the type information reception unit 108 is not present in the electrode information storage unit 109, the three dimensional display TV cannot determine what electrodes are mounted on the eyeglasses. For example, in the case of the eyeglasses shown in FIG. 16, the eyeglasses type ID "PX2-211" is registered with a table shown in FIG. 5 (i.e., with the electrode information storage unit 109), and in the case of the eyeglasses shown in FIG. 17, the eyeglasses type ID "SA1-01" is registered with the table of FIG. 5 (i.e., with the electrode information storage unit 109). Thus, the three-dimensional display TV can confirm electrode mounting positions on the eyeglasses simply by the type information. As shown in FIG. 18, however, in the case of the eyeglasses type ID "SX1-532", manufactured by company Sh, the eyeglasses type ID is not registered with the table of FIG. 5 (i.e., with the electrode information storage unit 109). Thus, the three-dimensional display TV cannot check the electrode mounting positions on the eyeglasses while the eyeglasses transmit the type information to the three-dimensional display TV. FIG. 18 is a diagram showing electrode mounting positions on certain eyeglasses ((b) of FIG. 18) and the registration details (electrode position information in (a) of FIG. 18).

When the position of the electrode cannot be confirmed despite that the potential is detected at the electrode, it is difficult for the three-dimensional display TV to determine whether the viewer is wearing the eyeglasses while the three-dimensional display TV knows, by the potential, that the eyeglasses are in contact with the viewer's skin. For example, although the biopotential is measured at the electrode located at RB or LB shown in FIG. 6 and the eyeglasses are being held by hand, the electrodes at these positions are, in many cases, in contact with the hand. Thus, the viewer is not necessarily wearing the eyeglasses. Moreover, the side-to-side movements of the eyes can be measured by the electrodes at RR and RL and it is conceivable that a state of eye fatigue can be measured by using these eye movements. However, insofar as the three-dimensional display TV 202 cannot confirm the electrode mounting positions on the eyeglasses, it is also difficult to estimate the viewer state by using the potential at the electrode.

Thus, in the present variation, when the type information of the eyeglasses is not registered with the electrode information storage unit 109, the eyeglasses transmit the information on the electrode mounting positions to the three-dimensional display TV, thereby allowing the three-dimensional display TV to determine the processing method (i.e., execute the function using the potential) when the change of potential at the electrode is successfully measured.

Figure 15:
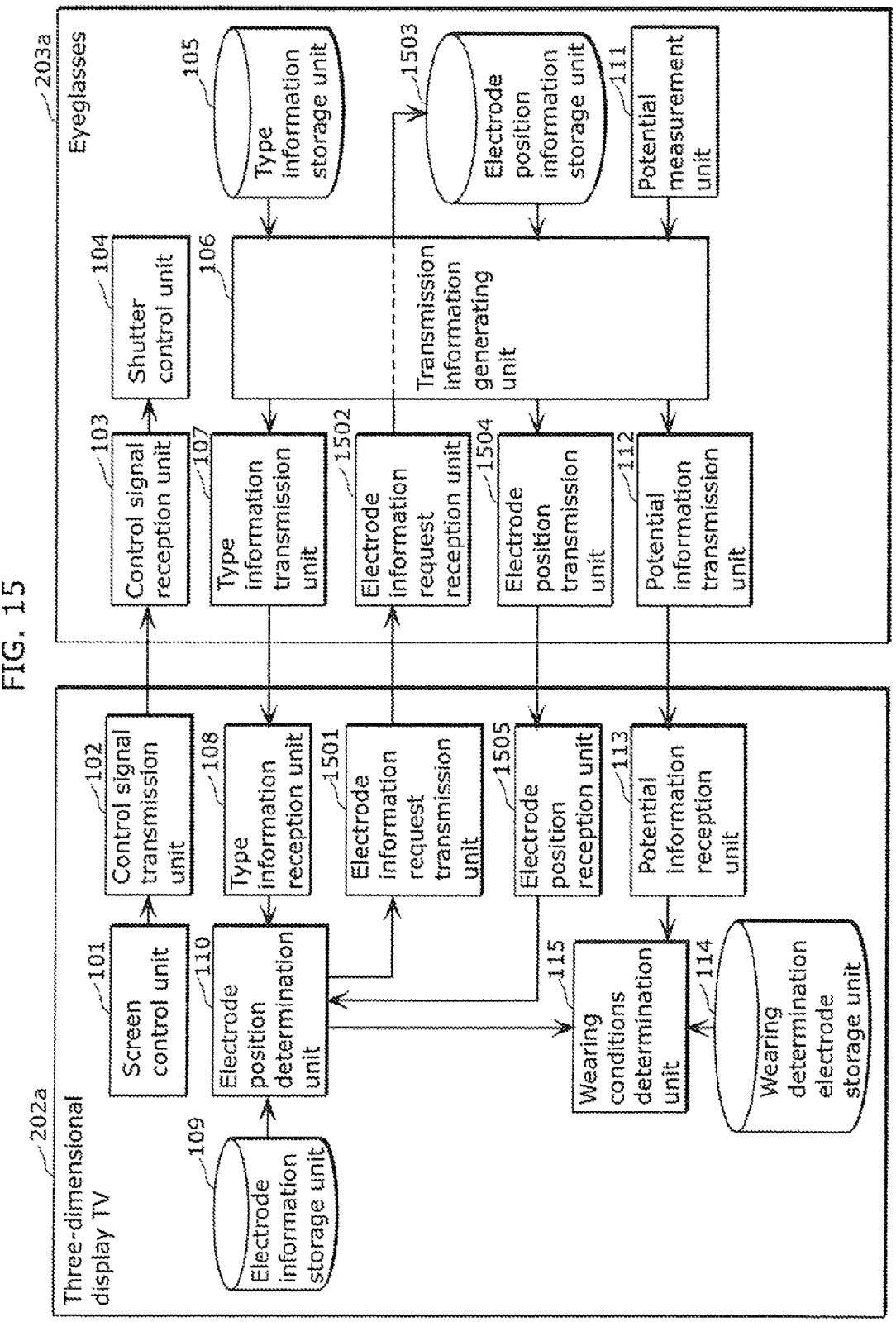
FIG. 15 is a diagram showing an example configuration of a three-dimensional image display system according to a variation 1 of the embodiment.

An example configuration of a three-dimensional image display system according to the present variation is shown in FIG. 15. The three-dimensional image display system includes a three-dimensional display TV 202a by way of example of a display device, and three-dimensional eyeglasses 203a with a biometric sensor by way of example of three-dimensional eyeglasses. In FIG. 15, the same reference signs are given to refer to modules that have the same functions as those shown in FIG. 1 and the description thereof will be omitted. Modules newly added to the above embodiment will be described.

The three-dimensional display TV 202a according to the present variation includes an electrode information request transmission unit 1501 and an electrode position reception unit 1505, in addition to the configuration of the three-dimensional display TV 202 according to the above embodiment. Meanwhile, the eyeglasses 203a includes an electrode information request reception unit 1502, an electrode position information storage unit 1503, and an electrode position transmission unit 1504, in addition to the configuration of the eyeglasses 203 according to the above embodiment.

The electrode information request transmission unit 1501 is a communication unit which requests the eyeglasses 203a to transmit the electrode position information indicating the positions of the electrodes included in the eyeglasses 203a when the type information received by the type information reception unit 108 is not included in the electrode information stored in the electrode information storage unit 109.

The electrode information request reception unit 1502 is a communication unit which receives the request transmitted from the electrode information request transmission unit 1501.

The electrode position information storage unit 1503 is a memory or the like storing information (the electrode position information) on mounting positions of the electrodes included in the eyeglasses 203a. Part (a) of FIG. 18 shows, by way of example, the information stored in the electrode position information storage unit 1503. Here is shown the memory storing various pieces of information including "Electrode position information" at the factory default settings.

The electrode position transmission unit 1504 is a communication unit which transmits, to the three-dimensional display TV 202a, information (processed electrode position information) obtained by the transmission information generating unit 106 processing the electrode position information stored in the electrode position information storage unit 1503 into a format that can be received by the three-dimensional display TV 202a.

The electrode position reception unit 1505 is a communication unit which receives the electrode position information transmitted from the electrode position transmission unit 1504.

Next, operation of the three-dimensional image display system according to the present variation configured as described above will be described.

It is assumed that the type information reception unit 108 has now received the eyeglasses type ID "SX1-532" as the type information from the eyeglasses 203a. Here, the electrode position determination unit 110 searches through the electrode information (table in FIG. 5) stored in the electrode information storage unit 109 for the eyeglasses type ID "SX1-532" in vain. Thus, the electrode information request transmission unit 1501 requests the eyeglasses 203a to transmit information (the electrode position information) on the electrode mounting positions. For example, the electrode information request transmission unit 1501 generates data indicative of a transmission request as shown in (a) of FIG. 19 and transmits the generated data to the eyeglasses 203a to request the eyeglasses 203a to communicate the electrode positions.

On the other hand, once received the data shown in (a) of FIG. 19, the electrode information request reception unit 1502 searches for the electrode position information (herein, information indicating that four electrodes are mounted at RR, RF, LR, and LF) through information stored in the electrode position information storage unit 1503. It should be noted that the electrode position information is, as shown in FIG. 6, represented in a format preset as a standard (in the standard, representation associated with the electrode positions is specified).

The electrode position transmission unit 1504 transmits the electrode position information stored in the electrode position information storage unit 1503, provided that in the present embodiment, the electrode position information which indicates four positions RL, RF, LR, and LF of the electrodes and is stored in the electrode position information storage unit 1503 is processed by the transmission information generating unit 106 into the format as shown in (b) of FIG. 19 and transmitted. Then, the electrode position reception unit 1505 receives information on electrode position information shown in (b) of FIG. 19. Thus, the three-dimensional display TV 202a can confirm the states of the electrodes mounted on the powered-on eyeglasses 203a. It should be noted that new type information received from the eyeglasses 203a, i.e., new electrode position information on new eyeglasses type ID may be stored in the electrode information storage unit 109.

Variation 2 of Embodiment

Next, a variation 2 of the above embodiment will be described.

In the above embodiment, the biopotential at the electrode is utilized to determine whether the viewer is wearing the eyeglasses. However, the function using the biopotential can measure not only the wearing conditions of the viewer but also the eye movement of the viewer. In this case, for example, functions that may be provided by the three-dimensional display TV 202 are selected according to the positional information on the electrodes mounted on the eyeglasses so as to be selectively utilized by the viewer. To achieve this, it is necessary to pre-store, in the three-dimensional display TV 202, information with respect to what information on the potentials at electrodes is required for the function using the electrodes. Thus, according to the present variation, a three-dimensional image display system will be described which can selectively execute a plurality of functions using the biopotential obtained by the eyeglasses.

Figure 20:
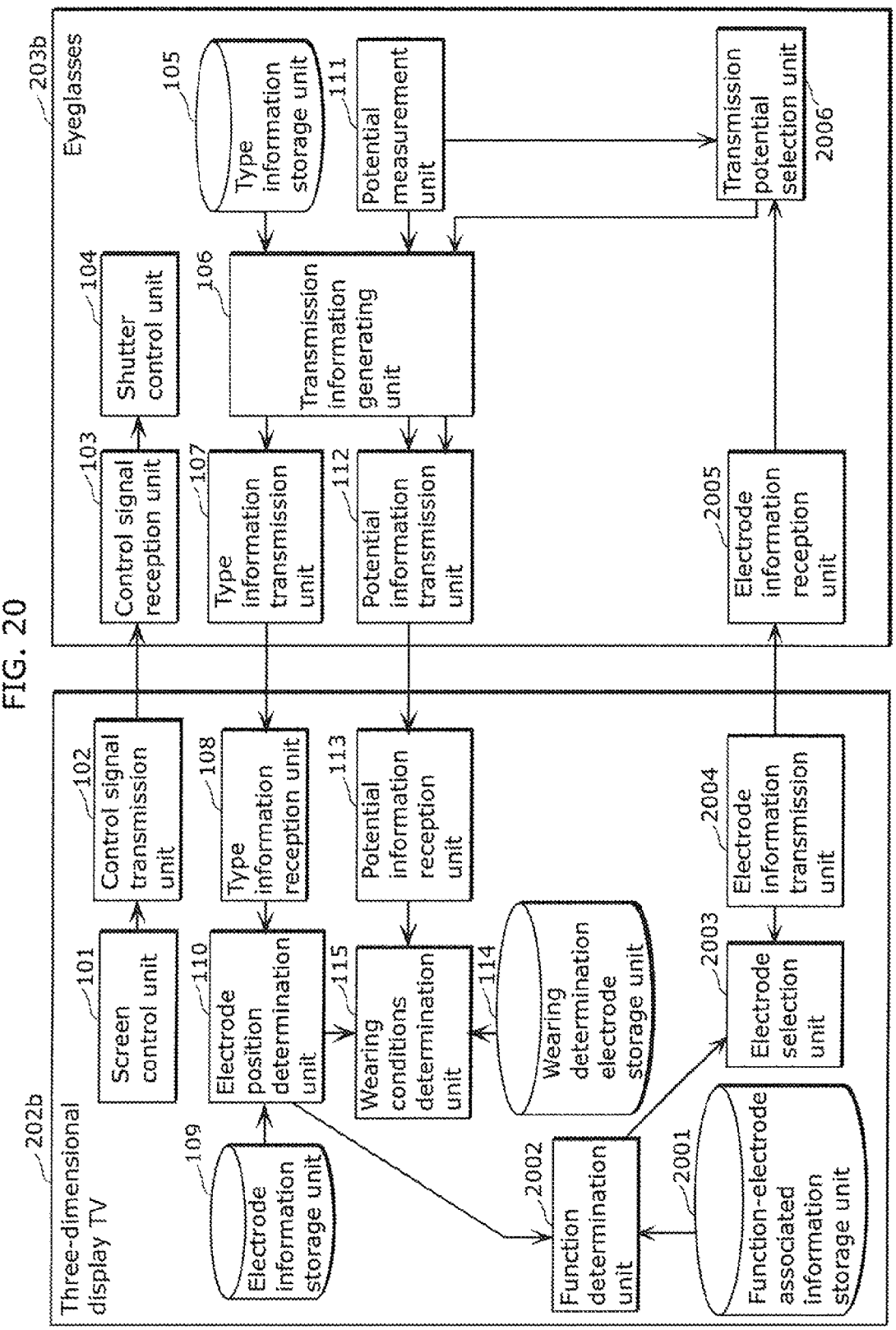
FIG. 20 is a diagram showing an example configuration of a three-dimensional image display system according to a variation 2 of the embodiment.

An example configuration of a three-dimensional image display system according to the variation 2 is shown in FIG. 20. The three-dimensional image display system includes a three-dimensional display TV 202b by way of example of a display device and three-dimensional eyeglasses 203b with a biometric sensor by way of example of three-dimensional eyeglasses. It should be note that the same reference signs are given to refer to modules that perform the same operations as in the above embodiment. Modules newly added to the present variation will be described with reference to FIG. 20.

The three-dimensional display TV 202b includes a function-electrode associated information storage unit 2001, a function determination unit 2002, an electrode selection unit 2003, and an electrode information transmission unit 2004, in addition to the configuration of the three-dimensional display TV 202 according to the above embodiment. Meanwhile, the eyeglasses 203b include an electrode information reception unit 2005 and a transmission potential selection unit 2006, in addition to the configuration of the eyeglasses 203 according to the above embodiment.

The function-electrode associated information storage unit 2001 is a memory or the like pre-storing function-electrode associated information associating a function of the three-dimensional display TV 202b, which uses a biopotential at the electrode mounted on the eyeglasses, and the electrode position information indicative of the position of the electrode required for the function. Here, the function-electrode associated information storage unit 2001 stores the function-electrode associated information as a table of association indicating the positions of the electrodes required for the function of the three-dimensional display TV 20b using the biopotential.

The function determination unit 2002 is a processing unit which refers to the function-electrode associated information stored in the function-electrode associated information storage unit 2001 to identify a function associated with the electrode position information indicative of the electrode positions determined by the electrode position determination unit 110, to determine a function which may be implemented by the three-dimensional display TV 202b, from among functions stored in the function-electrode associated information storage unit 2001. Here, the function determination unit 2002 determines the function that may be implemented by the three-dimensional display TV 202b, based on information on the electrode positions mounted on the eyeglasses which is acquired from the function-electrode associated information storage unit 2001 and by the electrode position determination unit 110.

The electrode selection unit 2003 is a processing unit which specifies some electrodes from among the electrodes mounted on the eyeglasses 203b, as electrodes required for implementing the function determined by the function determination unit 2002. In the present embodiment, based on the function determined by the function determination unit 2002, the electrode selection unit 2003 selects information on the required electrodes, from among the electrode positions obtained by the electrode position determination unit 110.

The electrode information transmission unit 2004 is a communication unit which transmits information (i.e., information specifying the electrode) on a position of the electrode selected by the electrode selection unit 2003 to the eyeglasses 203b.

The electrode information reception unit 2005 is a communication unit which receives the electrode information transmitted from the three-dimensional display TV 202b.

The transmission potential selection unit 2006 is a processing unit which selects, from among the potential measured by the potential measurement unit 111, only the potential at the electrode specified by the electrode information received by the electrode information reception unit 2005, and outputs the selected potential to the transmission information generating unit 106.

Next, operation of each module will be described. The function-electrode associated information storage unit 2001 stores association (function-electrode associated information) between the functions that may be implemented by the three-dimensional display TV 202b and information (the electrode position information) on the positions of the electrodes required for the implementation. FIG. 21 is a diagram showing an example of the function-electrode associated information stored in the function-electrode associated information storage unit 2001. Here, for example, as indicated in a function "Eyeglasses-wearing check" shown in FIG. 21, it is indicated that four electrodes at RL, RR, LR, and LL are required to implement a function of confirming that the viewer is wearing the eyeglasses and switching the 2D display to the 3D display. Moreover, as indicated in a function "Fatigue measurement by convergence" shown in FIG. 21, four electrodes (RL, RR, LR, LL) are required also to implement the function of measuring the eye fatigue by convergence. As indicated in a function "Fatigue measurement by the number of eye blinks" shown in FIG. 21, however, in the case of the fatigue measurement by the number of eye blinks, despite the same fatigue measurement, the measurement can be made by the number of eye blinks in the eye movement of either the left or the right eye. Thus, it is indicated that fatigue measurement can be made ("(RL, RR) or (LR, LL)") by the eyeglasses insofar as the electrodes are mounted at RL and RR which allow the measurement of the eye movement of the right eye or the electrodes are mounted at LR and LL which allow the measurement of the eye movement of the left eye. As described above, the function-electrode associated information storage unit 2001 stores the information (herein, the electrode position information) specifying the electrodes required for the functions of the three-dimensional display TV 202b.

Next, the function determination unit 2002 determines the function that may be implemented by the three-dimensional display TV 202b, based on the position of the electrode mounted on the eyeglasses that is detected by the electrode position determination unit 110 and the electrode position information stored in the function-electrode associated information storage unit 2001. For example, if it has been determined, from the result of the determination by the electrode position determination unit 110, that the eyeglasses in operation have only two electrodes mounted thereon at RL and RR, the function determination unit 2002 determines that the eyeglasses can achieve only a function of a simplified eyeglasses-wearing check. On the other hand, if it has been determined, from the result of the determination by the electrode position determination unit 110, that the electrodes are mounted at RL, RR, LR, and LL, all the functions shown in FIG. 21 can be implemented. Thus, the function determination unit 2002 presents the viewer with the functions that can be implemented on the screen as shown in FIG. 22, prompting for selection input. As a result, the electrode selection unit 2003 locates the electrodes required for the selected function, and notifies the eyeglasses 203b of information indicative of the located positions of the electrodes via the electrode information transmission unit 2004. Herein, the electrode information transmission unit 2004, for example, requests the eyeglasses 203b to transmit information on only the potentials at the electrodes located at the RL, RF, LR, and LF as shown in FIG. 23.

The electrode information reception unit 2005 receives the information shown in FIG. 23 to acquire electrode information required in the three-dimensional display TV 202b. As a result, the information received by the electrode information reception unit 2005 is communicated to the transmission potential selection unit 2006, and the transmission potential selection unit 2006 narrows down the electrodes the potential information at which is to be transmitted to the three-dimensional display TV 202b. According to the present variation, the locations RL, RF, LR, and LF of the electrode are registered with the transmission potential selection unit 2006, the potential information of only those electrodes is selected and transmitted from the eyeglasses 203b to the three-dimensional display TV 202b. Specifically, the potential information transmission unit 112 transmits, to the three-dimensional display TV 202*b*, the potential information on the biopotential measured at the electrodes specified by the information received by the electrode information reception unit 2005, among the potential information obtained from the measurement by the potential measurement unit 111.

The operation described above allows the eyeglasses to selectively transmit, according to the function required in the three-dimensional display TV 202*b*, the potential information on the required electrodes even if the eyeglasses have many electrodes mounted thereon, allowing for the reduction of communication costs.

Variation 3 of Embodiment

Next, a variation 3 of the above embodiment will be described.

Once a dynamic combination by bidirectional communications between the three-dimensional display TV and the eyeglasses are allowed, the viewer can watch a plurality of three-dimensional display TVs for 3D video view, using a pair of eyeglasses. Thus, when the eyeglasses originate the type information upon powered on, the eyeglasses can be used for the plurality of three-dimensional display TVs. However, the viewer actually views one three-dimensional display TV. Thus, the other three-dimensional display TVs should not perform processing that corresponds to the eyeglasses. Specifically, while the corresponding three-dimensional display TV switches the display from 2D display to 3D display, the other three-dimensional display TVs may not intend to change the display from 2D display to 3D display.

Thus, in the present variation, when the type information of the eyeglasses is registered with the three-dimensional display TV, the three-dimensional display TV notifies another three-dimensional display TV that the three-dimensional display TV is to operate in cooperation with the registered eyeglasses.

Figure 24:
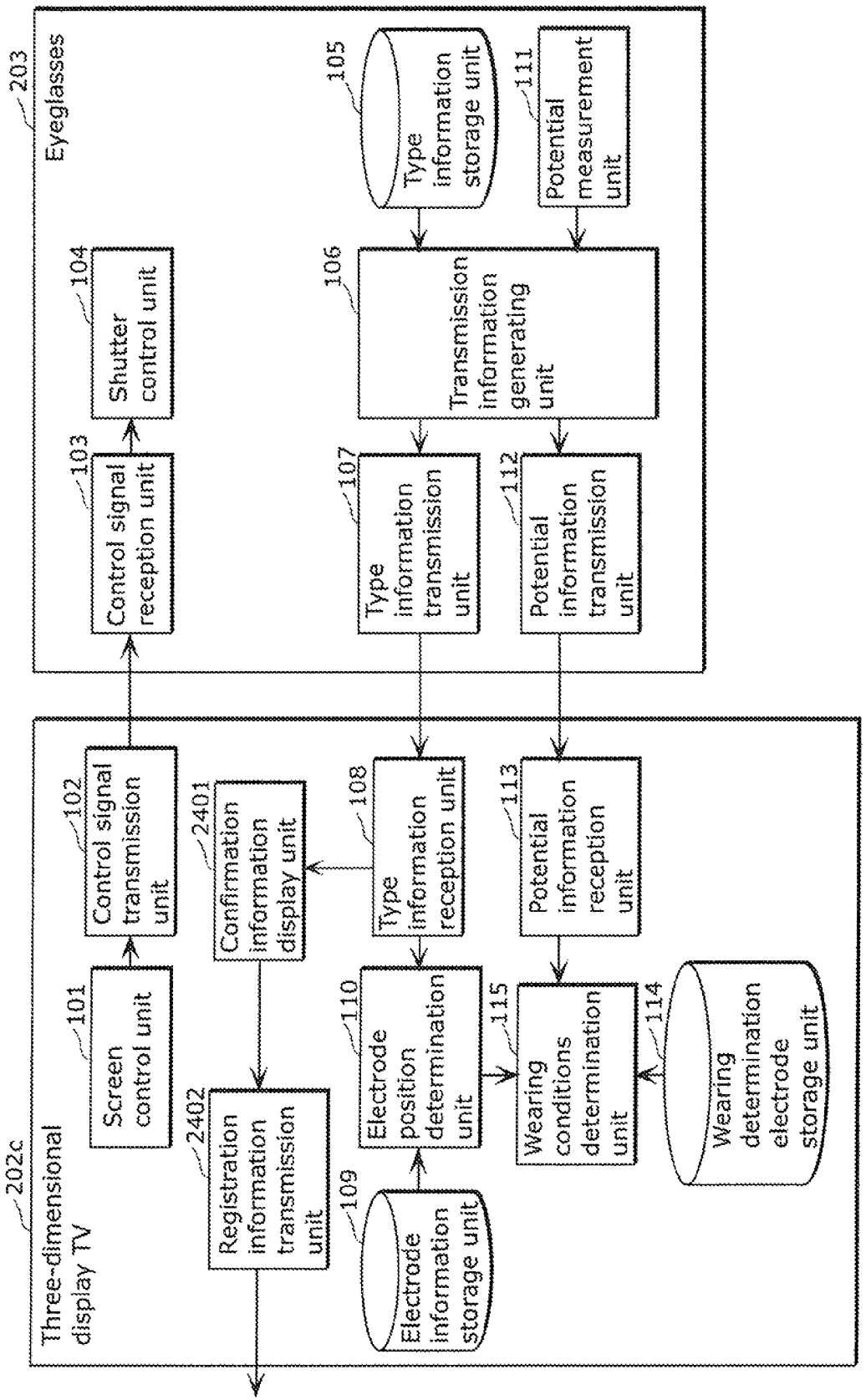
FIG. 24 is a diagram showing an example configuration of a three-dimensional image display system according to a variation 3 of the embodiment.

FIG. 24 is a diagram showing an example configuration of a three-dimensional image display system according to the present variation. The three-dimensional image display system includes a three-dimensional display TV 202*c* by way of example of a display device, and three-dimensional eyeglasses 203 with a biometric sensor by way of example of three-dimensional eyeglasses. The same reference signs are given to refer to modules that operate in the same manner as those shown in the above embodiment. Modules newly added to the present variation will be described with reference to FIG. 24.

The three-dimensional display TV 202*c* includes a confirmation information display unit 2401 and a registration information transmission unit 2402, in addition to the configuration of the three-dimensional display TV 202 according to the above embodiment.

The confirmation information display unit 2401 is a processing unit which presents (displays on a screen of the three-dimensional display TV 202*c*) the received type information to the viewer when the type information reception unit 108 has received the type information.

The registration information transmission unit 2402 is a communication unit which, when there is input from the viewer to the display by the confirmation information display unit 2401, transmits to, another display device such as the three-dimensional display TV, that the three-dimensional display TV 202*c* and the eyeglasses 203 are to be caused to operate in cooperation.

More specifically, upon registration of the eyeglasses type ID received by the type information reception unit 108 with the three-dimensional display TV 202*c*, the confirmation information display unit 2401 presents the viewer with the confirmation screen as shown in (a) of FIG. 8. When the viewer confirmation is obtained, the registration information transmission unit 2402 broadcasts the eyeglasses type ID and ID (ID that can be an address over communication) of the three-dimensional display TV 202*c*. As a result, another three-dimensional display TV that has received the type information of the eyeglasses can confirm the content originated from the registration information transmission unit 2402 of the three-dimensional display TV 202*c* and does not resister the type information of the eyeglasses. This achieves the type information of the eyeglasses being used by the viewer to be registered only with the one display device (herein, the three-dimensional display TV) confirmed by the viewer, even under a situation where the plurality of display devices such as the three-dimensional display TVs exists.

Figure 25B:
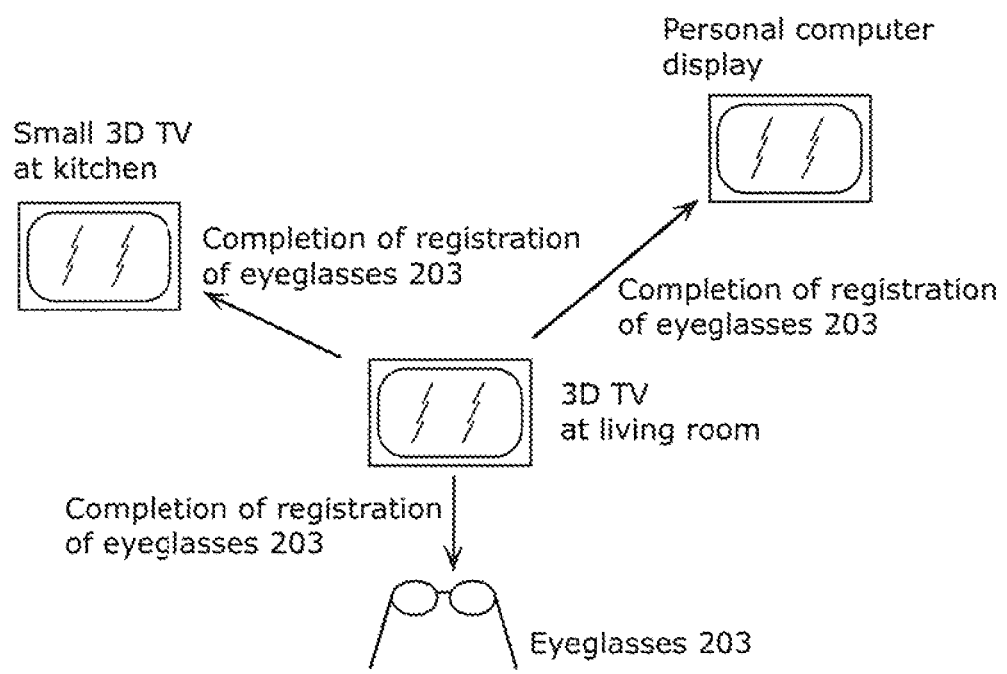
FIG. 25B is a diagram illustrating the concept of broadcasting using TVs.

A conceptual diagram is shown in FIG. 25A in which information indicating that the type information of the eyeglasses has been registered with a predetermined display device (herein, the three-dimensional display TV) is broadcast. In FIG. 25A, when the type information of the eyeglasses 203 is registered with a 3D TV 1 at living room, the 3D TV 1 at the living room notifies, via a wireless network, about the registration of the type information of the eyeglasses 203 to a display device (herein, a 3D TV 2) to which the wireless network is reachable. In FIG. 25A, the 3D TV 2 at kitchen or a personal computer display (not shown) at the living room is present within reach by the wireless network, and the display device which can perform the 3D display knows that the type information of the eyeglasses 203 has been registered with the 3D TV 1. This allows for a setting that only the 3D TV 1 at the living room can operate in cooperation with the eyeglasses 203 and the other display device to which the wireless network is reachable does not operate in cooperation with the eyeglasses 203. In other words, the eyeglasses 203 operate by a control signal from the 3D TV 1 at the living room even when the viewer wearing the eyeglasses 203 moves to the front of the personal computer display which can perform 3D display. Thus, the eyeglasses 203 do not malfunction.

A specific processing flow will be described with reference to a sequence illustrated in FIG. 25A. FIG. 25A is fundamentally the same as the sequence shown in FIG. 13B described in the above embodiment, and thus no further description of the same processing will be provided. In S2503, the eyeglasses 203 originates information shown in (a) of FIG. 26, and the 3D TV 1 and the 3D TV 2 that have received the information present a registration screen as shown in (a) of FIG. 8 to the viewer. Thereafter, a TV (herein, the 3D TV 1) to which input of the registration has been made from the viewer broadcasts the information as shown in (b) of FIG. 26, i.e., information indicating that the cooperation of the display device "tv 321" and the eyeglasses "324AS89732" has been registered (S2507). As a result, although received the type information of the eyeglasses 203, the 3D TV 2 that has received communication content for establishing cooperation with other 3D TV (herein, the 3D TV 1) deletes the registration of the type information of the eyeglasses 203 (S2508). This establishes cooperation between the 3D TV 1 and the eyeglasses 203, and the eyeglasses are controlled by the control signal (a signal for switching the shutters for the left and the right images) from the 3D TV 1.

As set forth above, the three-dimensional image display system, the three-dimensional image display method, and the three-dimensional eyeglasses have been described with reference to a certain embodiment and the variations 1 to 3 thereof. However, the present disclosure is not limited to the embodiment and the variations. Various modifications to each of the embodiment and the variations that may be conceived by those skilled in the art and a form obtained by any combination of the components included in each of the embodiment and the variations are included in the present disclosure, without departing from the spirit of the present disclosure.

Moreover, each of the functional blocks shown in the above block diagrams (FIG. 1, FIG. 15, FIG. 20, and FIG. 24) may be achieved in a form of an integrated circuit or an LSI. The LSI may be mounted on one chip for each functional block, or some or all the functional blocks may be mounted on one chip in configuration units of the display device or the eyeglasses. Here, the term LSI is used. However, IC, system LSI, super LSI, ultra LSI may be used depending on the difference in degree of integration.

Moreover, ways to achieve integration are not limited to the LSI, and a special circuit or a general purpose processor and so forth can also achieve the integration. An FPGA (Field Programmable Gate Array) which is programmable after manufacturing the LSI, or a reconfigurable processor in which connection or settings of circuit cells in LSI reconfigurable, may be utilized or the integration.

Moreover, the display device (the three-dimensional display TV according to the present embodiment or the like) included in the three-dimensional image display system according to the present disclosure may be implemented in a computer system and software. FIG. 27 is a block diagram of a hardware configuration used when achieving the three-dimensional display TV according to the present embodiment in a computer system 19 and software. The computer system 19 includes, as shown in FIG. 27, an input unit 11 such as a keyboard and a mouse, a storage unit 12 such as a hard disk, an output unit 13 such as a display device, a CPU 14, a ROM 15, a RAM 16, and an input/output I/F 17 which inputs/outputs signals to/from an external device. Specifically, the control signal transmission unit 102, the type information reception unit 108, the potential information reception unit 113, the electrode information request transmission unit 1501, and the electrode position reception unit 1505 which are included in the three-dimensional display TV are each implemented in the input/output I/F 17. Moreover, the type information storage unit 105, the wearing determination electrode storage unit 114, and the function-electrode associated information storage unit 2001 included in the three-dimensional display TV are each implemented in the storage unit 12. Moreover, the screen control unit 101, the electrode position determination unit 110, the wearing conditions determination unit 115, the function determination unit 2002, and the electrode selection unit 2003 included in the three-dimensional display TV are each implemented by the CPU 14 utilizing the RAM 16 as a temporary storage area and executing a program stored in the ROM 15 or the storage unit 12. Herein, the computer program includes a combination of a plurality of instruction codes indicative of instructions to the computer to achieve predetermined functionality.

In other words, such a program is a program for the display device, the program for causing a computer (or a processor) to execute: receiving type information which is information transmitted from the three-dimensional eyeglasses and identifying a type of the three-dimensional eyeglasses; referring to electrode information indicative of a plurality of pairs of the type information and electrode position information indicative of a position of an electrode included in three-dimensional eyeglasses, to extract electrode position information corresponding to the received type information, and based on the extracted electrode position information, determining a position of each of one or more electrodes included in the three-dimensional eyeglasses, the type information and the electrode position information being previously associated with each other; receiving potential information transmitted from the three-dimensional eyeglasses which indicates a biopotential, of the viewer, measured at the one or more electrodes mounted on the three-dimensional eyeglasses; and associating the position of each of the one or more electrodes and the biopotential indicated by the potential information, based on the determined position of each of the one or more electrodes and the received potential information, to determine wearing conditions of the viewer wearing the three-dimensional eyeglasses.

Moreover, some or all components included in the display device according to the above embodiment may be configured with a detachable IC card or a detachable single module. The IC card or the module is a computer system which includes a microprocessor, a ROM, a RAM, or the like. The IC card or the module may include a super multi-function LSI. The IC card or the module performs its functionality by the microprocessor operating according to the computer program. The IC card or the module may be of tamper-resistant.

Moreover, the present disclosure may be achieved as the method illustrated in the flowcharts provided in the above embodiment. Moreover, the present disclosure may be implemented as a computer program for causing a computer to execute the method or a digital signal representing the computer program. Furthermore, the computer or the digital signal may be implemented in a computer-readable recording medium having the computer or the digital signal recorded therein, such as a flexible disk, a hard disk, a CD-ROM, a MO, a DVD, a DVD-ROM, a DVD-RAM, a BD (Blu-ray Disc (registered trademark)), and a semiconductor memory.

Moreover, the computer program or the digital signals may, of course, be transmitted via an electric communication line, a wireless or wired communication line, a network represented by the Internet, data broadcast, or the like.

Moreover, by transferring the program or the digital signals recorded in the non-transitory recording medium, or transferring the program or the digital signals via the network or the like, the display device or the method in the three-dimensional image display system may be performed in other independent computer system.

The herein disclosed subject matter is to be considered descriptive and illustrative only, and the appended Claims are of a scope intended to cover and encompass not only the particular embodiment(s) disclosed, but also equivalent structures, methods, and/or uses.

Industrial Applicability

An three-dimensional image display system according to one or more exemplary embodiments disclosed herein are widely applicable to an image display system in which a stereoscopic video is viewed using dedicated eyeglasses, and are useful for displaying three-dimensional videos on movie screens, TVs, and computer display screens. Furthermore, the present invention is applicable not only to content viewing but also to image display on medical equipment such as diagnostic imaging devices and endoscopes, games such as simulated surgery and simulated vehicle ride, and training systems.

The invention claimed is:

1. A three-dimensional image display system for presenting a three-dimensional image to a viewer, the three-dimensional image display system comprising:
a display device for alternately displaying a right-eye image and a left-eye image; and
three-dimensional eyeglasses including a left-eye shutter and a right-eye shutter for being worn by the viewer over face or head and setting the left-eye shutter to an open state when the left-eye image is displayed on the display device and setting the right-eye shutter to the open state when the right-eye image is displayed on the display device, wherein the three-dimensional eyeglasses include:
a type information transmission unit configured to transmit type information identifying a type of the three-dimensional eyeglasses to the display device;
a potential measurement unit configured to measure a biopotential of the viewer using one or more electrodes mounted on the three-dimensional eyeglasses, wherein at least one of the one or more electrodes is mounted at a location on the three-dimensional eyeglasses so as to come into contact with the viewer when the three-dimensional eyeglasses are worn by the viewer; and
a potential information transmission unit configured to transmit, as potential information, information on the biopotential measured by the potential measurement unit to the display device, and the display device includes:
a type information reception unit configured to receive the type information transmitted from the type information transmission unit;
an electrode information storage unit configured to store electrode information indicative of a plurality of pairs of the type information and electrode position information indicative of a position of an electrode included in three-dimensional eyeglasses that have the type information, the type information and the electrode position information being previously associated with each other;
an electrode position determination unit configured to refer to the electrode information stored in the electrode information storage unit to extract electrode position information corresponding to the type information received by the type information reception unit, and, based on the extracted electrode position information, determine the position of each of the one or more electrodes included in the three-dimensional eyeglasses;
a potential information reception unit configured to receive the potential information transmitted from the potential information transmission unit; and
a wearing conditions determination unit configured to associate the position of each of the one or more electrodes and the biopotential indicated by the potential information, based on the position of each of the one or more electrodes determined by the electrode position determination unit and the potential information received by the potential information reception unit, to determine wearing conditions of the viewer wearing the three-dimensional eyeglasses.

2. The three-dimensional image display system according to claim 1,
wherein when a biopotential at at least one electrode mounted at a predetermined position on the three-dimensional eyeglasses exceeds a predetermined value, the wearing conditions determination unit is configured to determine, as the wearing conditions, that the three-dimensional eyeglasses are worn by the viewer.

3. The three-dimensional image display system according to claim 1,
wherein the display device further includes
an electrode information request transmission unit configured to make a request to the three-dimensional eyeglasses to transmit the electrode position information indicative of the position of each of the one or more electrodes included in the three-dimensional eyeglasses when the type information received by the type information reception unit is not in the electrode information, the three-dimensional eyeglasses further include:
an electrode information request reception unit configured to receive the request from the electrode information request transmission unit; and
an electrode position transmission unit configured to transmit, to the display device, the electrode position information indicative of the position of each of the one or more electrodes included in the three-dimensional eyeglasses when the electrode information request reception unit receives the request, and
the wearing conditions determination unit is further configured to determine the wearing conditions, based on the position of each of the one or more electrodes indicated by the electrode position information transmitted by the electrode position transmission unit and the potential information received by the potential information reception unit.

4. The three-dimensional image display system according to claim 1,
wherein the display device further includes:
a function-electrode associated information storage unit configured to pre-store function-electrode associated information in which functions of the display device which use the biopotential at the one or more electrodes mounted on the three-dimensional eyeglasses and electrode position information indicative of a position of an electrode used for the functions are associated with each other; and
a function determination unit configured to refer to the function-electrode associated information stored in the function-electrode associated information storage unit to identify a function associated with the electrode position information indicative of the position of each of the one or more electrodes determined by the electrode position determination unit, to determine a function achievable by the display device, from among the functions stored in the function-electrode associated information storage unit.

5. The three-dimensional image display system according to claim 4,
wherein the display device further includes:
an electrode selection unit configured to select at least one electrode as the electrode required for achieving the function determined by the function determination unit, from among the one or more electrodes mounted on the three-dimensional eyeglasses; and
an electrode information transmission unit configured to transmit electrode information specifying the at least one electrode selected by the electrode selection unit to the three-dimensional eyeglasses.

6. The three-dimensional image display system according to claim 5,
wherein the three-dimensional eyeglasses further include
an electrode information reception unit configured to receive the electrode information transmitted from the electrode information transmission unit, and
the potential information transmission unit is configured to transmit, to the display device, the potential information on the biopotential measured at the at least one electrode specified by the electrode information received by the electrode information reception unit, among the potential information obtained by the potential measurement unit measuring the biopotential.

7. The three-dimensional image display system according to claim 1,
wherein the display device further includes:
a confirmation information display unit configured to, when the type information reception unit receives the type information, display the received type information; and
a registration information transmission unit configured to transmit, to another display device, notification that the display device and the three-dimensional eyeglasses are to operate in cooperation, when there is input from the viewer for display by the confirmation information display unit.

8. A three-dimensional image display method by a three-dimensional image display system for presenting a three-dimensional image to a viewer,
the three-dimensional image display system including:
a display device for alternately displaying a right-eye image and a left-eye image; and
three-dimensional eyeglasses including a left-eye shutter and a right-eye shutter for being worn by the viewer over face or head and setting the left-eye shutter to an open state when the left-eye image is displayed on the display device and setting the right-eye shutter to the open state when the right-eye image is displayed on the display device,
the three-dimensional image display method comprising:
transmitting, by the three-dimensional eyeglasses, type information identifying a type of the three-dimensional eyeglasses to the display device;
receiving, by the display device, the transmitted type information;
measuring, by the three-dimensional eyeglasses, a biopotential of the viewer using one or more electrodes mounted on the three-dimensional eyeglasses, wherein at least one of the one or more electrodes is mounted at a location on the three-dimensional eyeglasses so as to come into contact with the viewer when the three-dimensional eyeglasses are worn by the viewer;
transmitting, by the three-dimensional eyeglasses, information on the measured biopotential, as potential information, to the display device;
receiving, by the display device, the transmitted potential information;
storing, by the display device, electrode information indicative of a plurality of pairs of the type information and electrode position information indicative of a position of an electrode included in three-dimensional eyeglasses that have the type information, the type information and the electrode position information being previously associated with each other;
referring, by the display device, to the stored electrode information to extract electrode position information corresponding to the received type information, and, based on the extracted electrode position information, determining a position of each of one or more electrodes included in the three-dimensional eyeglasses; and
associating, by the display device, the determined position of each of the one or more electrodes and the biopotential indicated by the potential information, based on the determined position of each of the one or more electrodes and the received potential information, to determine wearing conditions of the viewer wearing the three-dimensional eyeglasses.

9. Three-dimensional eyeglasses for being worn by a viewer over face or head and operating in cooperation with a display device, the three-dimensional eyeglasses comprising:
a right-eye shutter and a left-eye shutter, states of which are switchable between an open state and a closed state;
a type information transmission unit configured to transmit, to the display device, type information identifying a type of the three-dimensional eyeglasses;
a potential measurement unit configured to measure a biopotential of the viewer using one or more electrodes mounted on the three-dimensional eyeglasses;
a potential information transmission unit configured to transmit, as potential information, information on the biopotential measured by the potential measurement unit to the display device; and
an electrode information reception unit configured to receive, from the display device, information specifying at least one electrode selected from among the one or more electrodes mounted on the three-dimensional eyeglasses,
wherein the potential information transmission unit is configured to transmit, to the display device, the potential information on the biopotential measured at the at least one electrode specified by the information received by the electrode information reception unit, from among the information on the biopotential measured by the potential measurement unit.

10. The three-dimensional eyeglasses according to claim 9, further comprising:
an electrode information request reception unit configured to receive, from the display device, a request for transmission of electrode position information indicative of the position of each of the one or more electrodes included in the three-dimensional eyeglasses; and
an electrode position transmission unit configured to transmit the electrode position information indicative of the position of each of the one or more electrodes included in the three-dimensional eyeglasses to the display device, when the electrode information request reception unit receives the request.

11. A non-transitory computer-readable storage medium having recorded therein a program for a display device for alternately displaying a right-eye image and a left-eye image in a three-dimensional image display system,
the three-dimensional image display system including the display device and three-dimensional eyeglasses having a left-eye shutter and a right-eye shutter for being worn by a viewer over face or head and setting the left-eye shutter to an open state when the left-eye image is displayed on the display device and setting the right-eye shutter to the open state when the right-eye image is displayed on the display device,
the program for causing a computer to execute:
receiving type information which is information transmitted from the three-dimensional eyeglasses and identifying a type of the three-dimensional eyeglasses;
referring to electrode information indicative of a plurality of pairs of the type information and electrode position information indicative of a position of an electrode included in three-dimensional eyeglasses, to extract electrode position information corresponding to the received type information, and based on the extracted electrode position information, determining a position of each of one or more electrodes included in the three-dimensional eyeglasses, the type information and the electrode position information being previously associated with each other;

receiving potential information transmitted from the three-dimensional eyeglasses which indicates a biopotential, of the viewer, measured at the one or more electrodes mounted on the three-dimensional eyeglasses; and associating the position of each of the one or more electrodes and the biopotential indicated by the potential information, based on the determined position of each of the one or more electrodes and the received potential information, to determine wearing conditions of the viewer wearing the three-dimensional eyeglasses.

* * * * *